US006645131B2

(12) United States Patent
Asp et al.

(10) Patent No.: US 6,645,131 B2
(45) Date of Patent: Nov. 11, 2003

(54) HYDROSTATIC TOOL SYSTEM

(76) Inventors: Andrew Asp, 6115 Woody La., Fridley, MN (US) 55432; Raliegh J. Jensen, 1986 Silvercreek La., Boise, ID (US) 83706

(*) Notice: Subject to any disclaimer, the term of this patent is extended or adjusted under 35 U.S.C. 154(b) by 0 days.

(21) Appl. No.: 10/076,953

(22) Filed: Feb. 15, 2002

(65) Prior Publication Data

US 2002/0128135 A1 Sep. 12, 2002

Related U.S. Application Data

(60) Provisional application No. 60/269,620, filed on Feb. 15, 2001.

(51) Int. Cl.[7] ............................................. B23Q 3/157
(52) U.S. Cl. ......................... 483/51; 483/31; 483/30; 483/902; 483/53; 483/67; 279/4.01; 279/4.03
(58) Field of Search ....................... 483/31, 30, 51, 483/902, 53, 67; 279/4.01, 4.03

(56) References Cited

U.S. PATENT DOCUMENTS 3,789,472 A  * 2/1974  Pegard ........................ 483/31
4,423,880 A  * 1/1984  Kosmowski ................ 279/4.07
4,581,811 A  * 4/1986  Eckle ............................ 483/36
4,651,405 A  * 3/1987  McMurtry ..................... 483/10
5,213,559 A  * 5/1993  Lunazzi ......................... 483/14

FOREIGN PATENT DOCUMENTS

EP    0239909    * 10/1987    ................... 483/31
WO   88/06944    *  9/1988    ................... 483/31
WO   99/56901    * 11/1999    ................... 483/31

* cited by examiner

Primary Examiner—A. L. Wellington
Assistant Examiner—Dana Ross
(74) Attorney, Agent, or Firm—Joseph W. Holland

(57) ABSTRACT

An hydrostatic tool system including a tool assembly having a hydrostatic tool holder for holding a rotating tool, for example a machine or cutting tool. The hydrostatic tool system may also include a tool storage system, a tool transport system and a tool drive system. The hydrostatic tool system may also include an hydraulic coupler for hydraulically connecting the hydrostatic tool holder to a pressurizing or depressurizing source. The hydrostatic tool system may also include a system controller.

9 Claims, 24 Drawing Sheets

HYDROSTATIC TOOL SYSTEM

This application claims the benefit of U.S. Provisional Application No. 60/269,620, filed Feb. 15, 2001.

BACKGROUND OF THE INVENTION

The present invention relates to machine tools, and more specifically, to an automated tool storage and handling device.

SUMMARY OF THE INVENTION

The present invention is directed to a hydrostatic tool system including a tool assembly having a hydrostatic tool holder for holding a rotating tool, for example a machine or cutting tool. The hydrostatic tool system may also include a tool storage system, a tool transport system and a tool drive system. The hydrostatic tool system may also include an hydraulic coupler for hydraulically connecting the hydrostatic tool holder to a pressurizing or depressurizing source. The hydrostatic tool system may also include a system controller.

Each tool assembly includes a hydrostatic tool holder having an inner sleeve nested within an outer sleeve which cooperate in such a manner as to form a gap between the outer circumferential surface of the inner sleeve and the inner circumferential surface of the outer sleeve. A chamber is defined by the gap between the inner and outer sleeves, the nesting configuration of the bulkheads and flanges of the inner and outer sleeves and the nesting configuration of the flanges of the inner and outer sleeves. The inner sleeve includes an inner bore configured to concentrically engage a machine spindle. The outer sleeve includes an outer circumferential surface configured to concentrically engage a rotatable tool. In one preferred embodiment of the invention, the hydrostatic tool holder outer sleeve includes an hydraulic fitting which permits the introduction, pressurization and extraction of the hydraulic fluid into the chamber between the inner sleeve and the outer sleeve. The hydraulic fitting may be configured as an hydraulic test point including a poppet valve. The hydraulic test point is configured to releasably engage and hydraulically communicate with an hydraulic coupler which, in turn, communicates hydraulically with a pressurized source of hydraulic fluid. The inner and outer sleeves of the hydrostatic tool holder deflect slightly under hydrostatic fluid pressure to engage both the spindle and the rotating tool.

The hydrostatic tool holder also includes a collar which is configured for gripping engagement by a pair of articulated clamping arms of the tool transport system and a pair of opposing fingers of a tool clamp of the tool storage system.

The hydrostatic tool system may also include a tool storage system. In one preferred embodiment of the invention, the tool storage system is configured as a turret including a plurality of tool assembly receivers. The turret is mounted on a shaft and a plurality of tool assembly receivers are connected to the turret. Each tool assembly receiver is configured to hold and support a tool assembly. The turret may be rotated and indexed to any selected position corresponding to a selected tool assembly. The tool storage system may include hydraulic, pneumatic, electrical or mechanical means to rotate and index the turret, for example a pneumatic rotary actuator. In one preferred embodiment of the invention, the turret is rotated by a rotary actuator, such as a model manufactured by Bimba Manufacturing Company, model No. PTF-196325 rotary actuator 325° with position feedback. Indexing or stopping turret rotation at a selected position is accomplished by a pneumatic stop cylinder such as the model No. M171-DBZ cylinder, 1½" bore and 1½" stroke, block mount cylinder, manufactured by the Bimba Manufacturing Company.

In the alternative, the tool storage system may feature a linear configuration wherein the tool assemblies are arranged side by side in sequence. Similarly, the tool storage system may feature a stacked configuration wherein the tool assemblies are arranged one above another or side by side. For instance, the tool storage system may include stacked rows or stacked turrets as desired.

In one preferred embodiment of the invention, the tool assembly receivers are configured as tool clamps. Each tool clamp includes a pair of opposing fingers. Each clamp is biased towards a closed position. A tool assembly may be forced against the clamp thereby gaining entry into the tool clamp. The spring bias creates ample compressive holding force to maintain the tool assembly securely in position at the tool storage system. In another preferred embodiment of the invention, the tool assembly receivers are configured as "dummy" spindles. In this embodiment of the invention, a tool assembly may be placed down on the "dummy" spindle with essentially the same motion employed by the tool transport system for placing the tool assembly on the motor driven spindle.

The hydrostatic tool system according to the present invention may also include a tool transport system. The tool transport system includes, generally, a tool assembly pick and place member for retrieving a tool assembly from the tool storage system and for placing the tool assembly on a motor driven spindle and a tool transport device for transporting the tool assembly between the tool storage system and a motor driven spindle. The tool transport system may also include a system for pressurizing the hydrostatic tool holder. The tool transport system may also include a system for the de-pressurization and extraction of hydraulic fluid from the hydrostatic tool holder.

In one preferred embodiment of the invention, the tool transport system includes a primary frame mounted to a carriage which may be advanced along an X axis by a horizontal travel actuator between the tool storage system and a motor driven spindle. The horizontal travel actuator may be configured as a rodless cylinder including a piston and a carriage slidable along an outer circumferential surface of a cylinder tube, the piston and the carriage each include magnets, allowing the piston to move the carriage along the cylinder tube by the attraction force between the magnets. A force transmitted to the piston, for instance fluid pressure, causes the piston to travel through the tube and is transmitted to the carriage through magnetic attraction thereby advancing the carriage along the cylinder tube. In one preferred embodiment of the invention, the rodless cylinder is a model TA-MS4D-2½B×2S-OSM, 2½" bore by 2" stroke rodless cylinder manufactured by TRD.

In another embodiment, the tool transport system includes a primary frame mounted to a rotatable carriage, which selectively rotates about a substantially vertical axis by operation of a rotational motion actuator and locates between two or more stations, a first station wherein a tool assembly is retrieved or placed at a tool storage system and a second station wherein the tool assembly is placed on a motor driven spindle. One such rotational motion actuator is manufactured by Bimba Manufacturing Company, model No. Q107221, 150° and 1⁄16" bore.

In one preferred embodiment of the invention, the tool transport system includes a lifting cylinder having a substantially vertical lifting capacity attached to the primary frame. A head frame assembly is attached to the lifting cylinder and is movable with the substantially vertical travel of the lifting cylinder along a Y axis. A clamping arm cylinder is also attached to the head frame assembly. A clamp arm frame is attached to the clamping arm cylinder and is movable with the substantially vertical travel of the clamping arm cylinder along a Y axis. A pair of articulated clamping arms are attached to the clamp arm frame and are actuated by the clamping arm cylinder. In one preferred embodiment of the invention, both the lifting cylinder and the clamping arm cylinder are of the double end type, wherein the piston is held stationary within a frame and the cylinder travels within the frame. In one preferred embodiment of the invention, the lifting cylinder includes a TRD model No. TA-MS4D-3¼Bx6S-OSM, 3¼" bore and 6" stroke double ended cylinder and the clamping arm cylinder includes a TRD model No. TA-MS4D-2½Bx2S-OSM, 2½" bore and 2" stroke double ended cylinder. In another preferred embodiment of the invention, the lifting cylinder includes a TRD model No. TA-MS4D-2½Bx7S-OSM, 2½" bore and 7" stroke double ended cylinder.

When the lifting cylinder is actuated in an upward direction, the head frame assembly moves vertically upward along the Y axis, and when the lifting cylinder is actuated in a downward direction, the head frame assembly moves vertically downward along the Y axis. When the clamping arm cylinder is actuated in an upward direction, first and second articulated clamping arms move to an open position, and when the clamping arm cylinder is actuated in a downward direction, first and second articulated clamping arms move to a closed or clamping position in gripping articulation.

In one preferred embodiment of the invention, the tool transport system includes an hydraulic coupler. The hydraulic coupler includes an inlet and an outlet. The hydraulic coupler hydraulically communicates with a pressurized source for an hydraulic fluid. In the preferred embodiment of the invention, the hydraulic coupler is configured to achieve hydraulic energization and de-energization of the hydrostatic tool holder in a substantially leak free manner.

The hydraulic coupler may be configured as a poppet actuator assembly and includes a poppet actuator inserted within an actuator cap. The poppet actuator is configured as a stem having a longitudinal axis and a central bore. The stem includes a first orifice which extends through the side wall of the stem at or near the first end of the stem and a second orifice which extends through the side wall of the stem at or near the second end of the stem. The stem extends longitudinally through a seal which seats in the actuator cap. The actuator cap includes a central bore including a seat for receiving the seal. The actuator cap attaches to an arm comprising a portion of the head frame assembly and moves vertically upward and downward along the Y axis, with the vertical travel of the lifting cylinder. The poppet actuator assembly also includes an hydraulic test point having a poppet valve. One such test point, the Minicheck® Test Point Coupling, is manufactured by the Schroeder Co. The poppet valve is spring loaded and biased towards a closed position. The hydraulic test point is oriented such that the poppet valve opens against pressure exerted by the poppet actuator stem thus permitting passage of hydraulic fluid past the valve. A more complete description of the operation of the coupler is set forth below in the detailed embodiment section.

In the preferred embodiment of the invention, a controller device including a control circuit operates and controls the various functions of the hydrostatic tool system. The controller device may be configured as a standalone or a networked personal computing device. The controller operates and controls any or all of the various functions of the hydrostatic tool system including selection of tool, rotation of the turret, travel of the carriage, actuation of the lifting and clamping cylinders, energization and de-energization of the hydraulic coupler and associated source for pressurized hydraulic fluid, operation of the spindle motor and operation of any associated workpiece feed mechanism.

DETAILED DESCRIPTION

Figure 1:
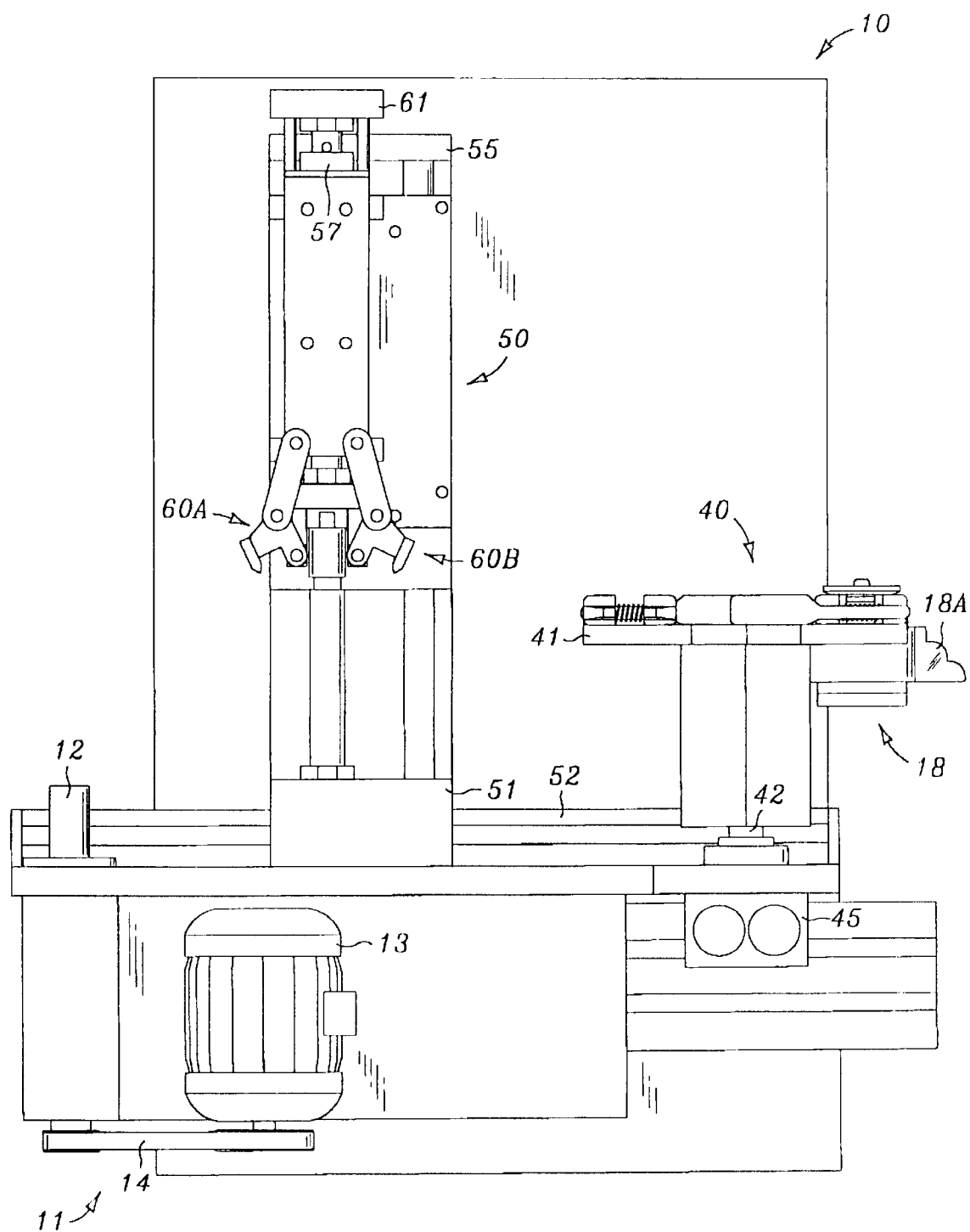
FIG. 1 is a representative front view of a hydrostatic tool system.
Figure 20:
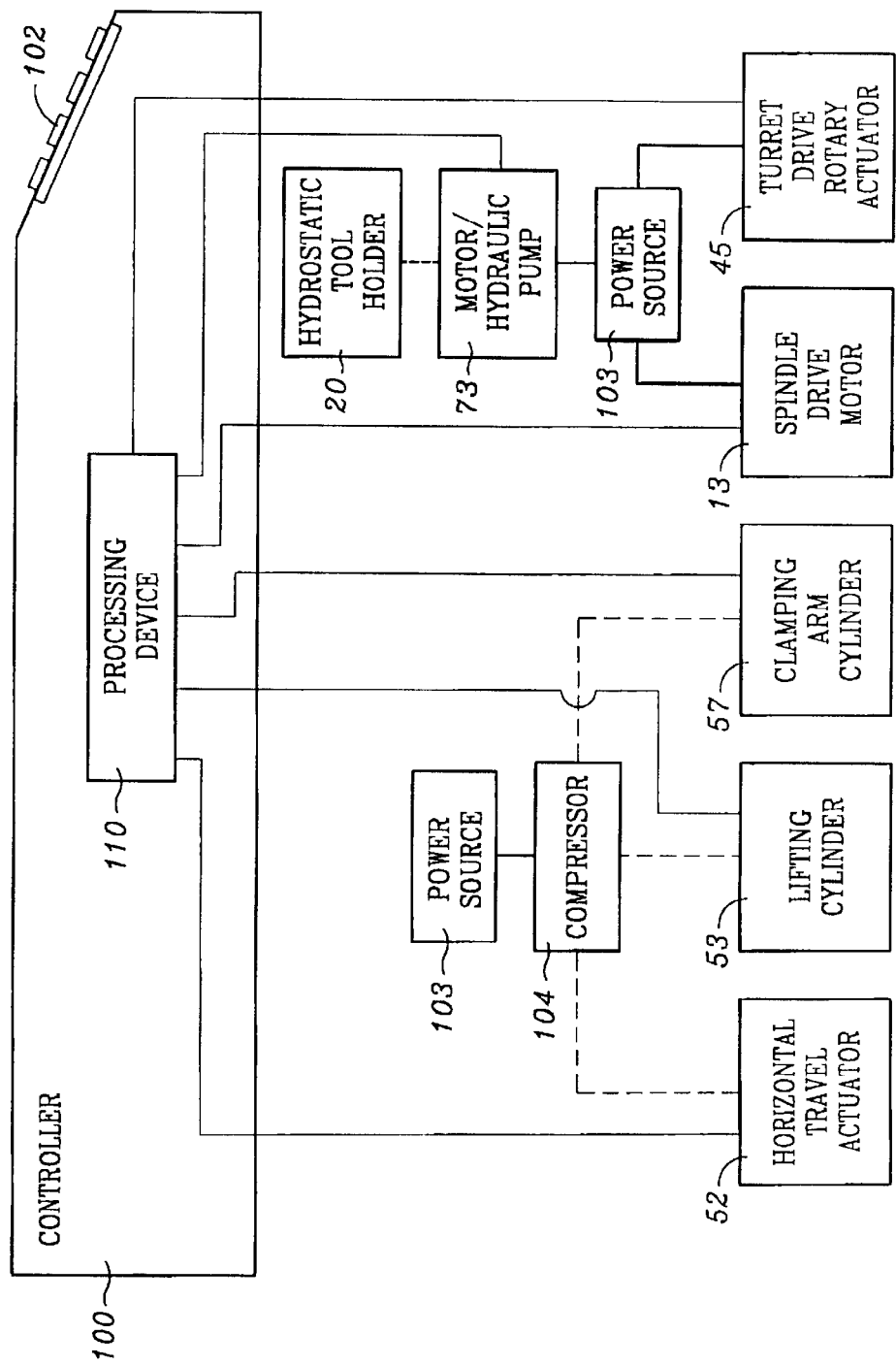
FIG. 20 is a representative schematic of an hydrostatic tool system including a controller according to the present invention.

Referring to FIG. 1, hydrostatic tool system 10 is shown including tool assembly 18, tool storage system 40, and tool transport system 50. Hydrostatic tool system 10 also includes drive system 11 including spindle 12 connected to motor 13 by belt 14. FIGS. 10–14 show hydraulic coupler 70 and FIG. 20 shows system controller 100.

FIGS. 2 through 14 depict sequentially the following steps, assemblies and systems: tool assembly 18A is held in tool storage system 40 for retrieval by tool transport system 50, (FIGS. 2 through 4); tool assembly 18A is held by first and second articulated clamping arms 60A and 60B for transport to spindle 12, (FIGS. 5 through 7); and tool assembly 18A is placed on spindle 12 by tool transport system 50 (FIGS. 8 through 14).

Figure 4:
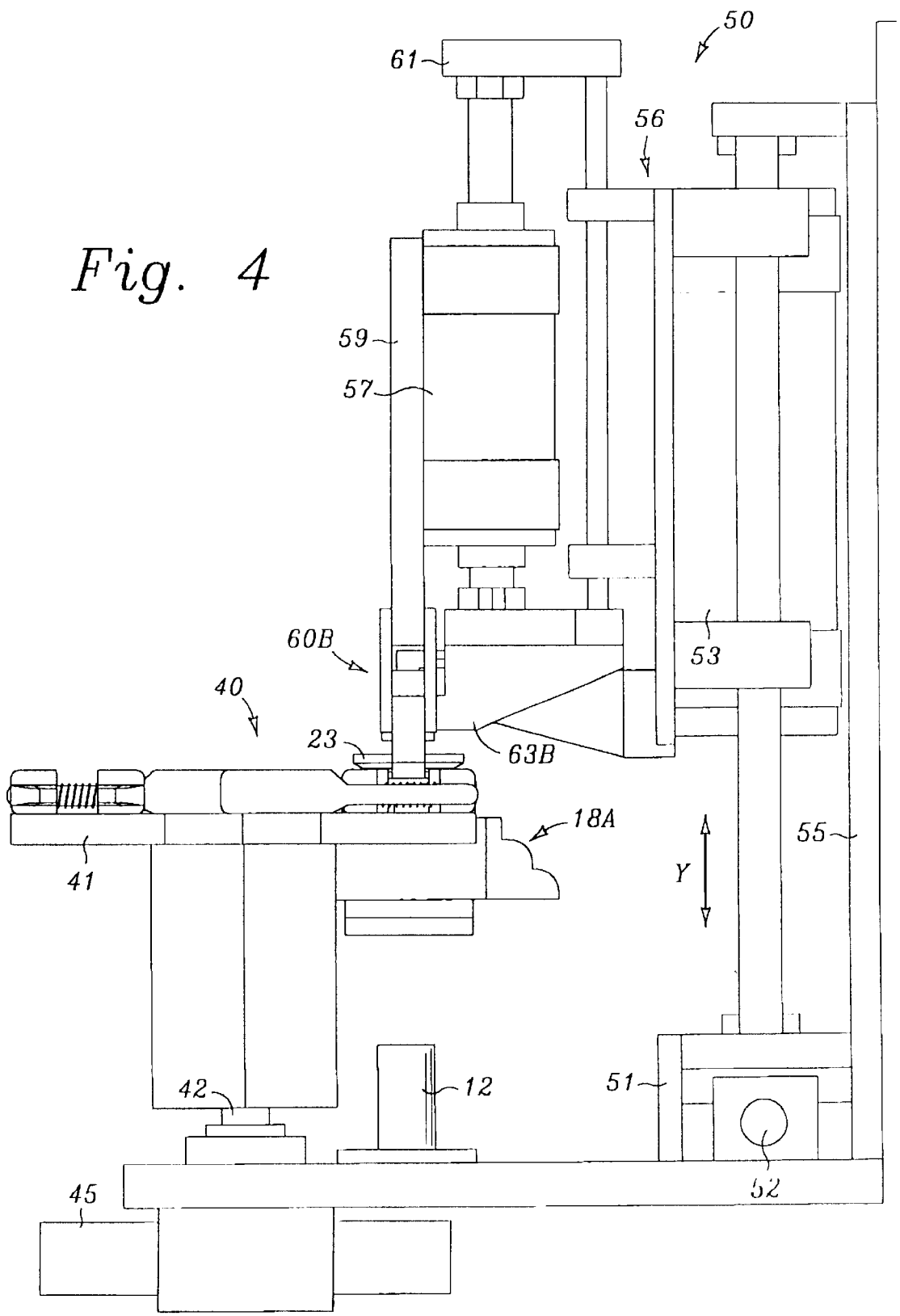
FIG. 4 is a representative side view of a tool assembly held by a tool storage system and a tool transport system.
Figure 5:
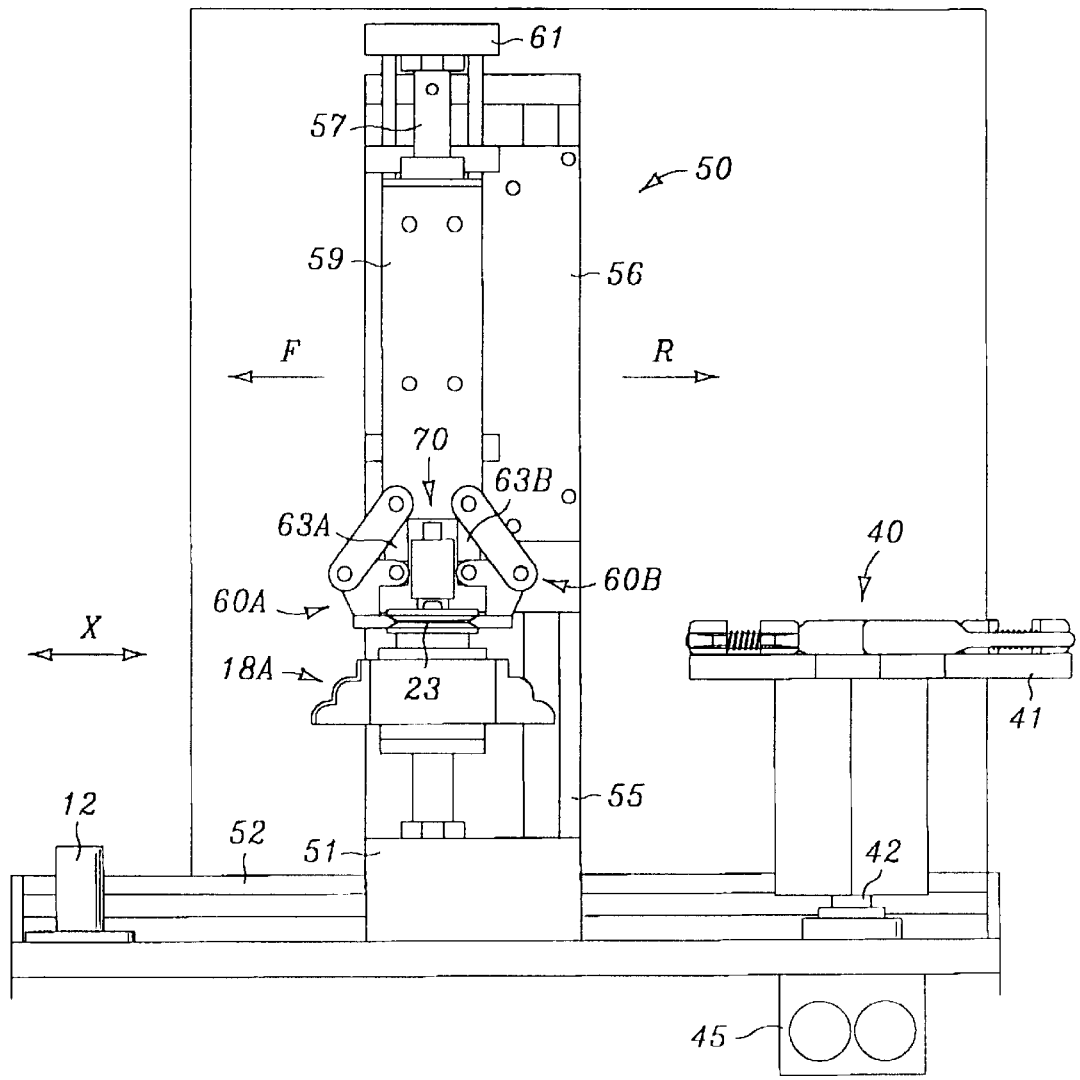
FIG. 5 is a representative front view of a tool storage system and a tool assembly held by a tool transport system.
Figure 6:
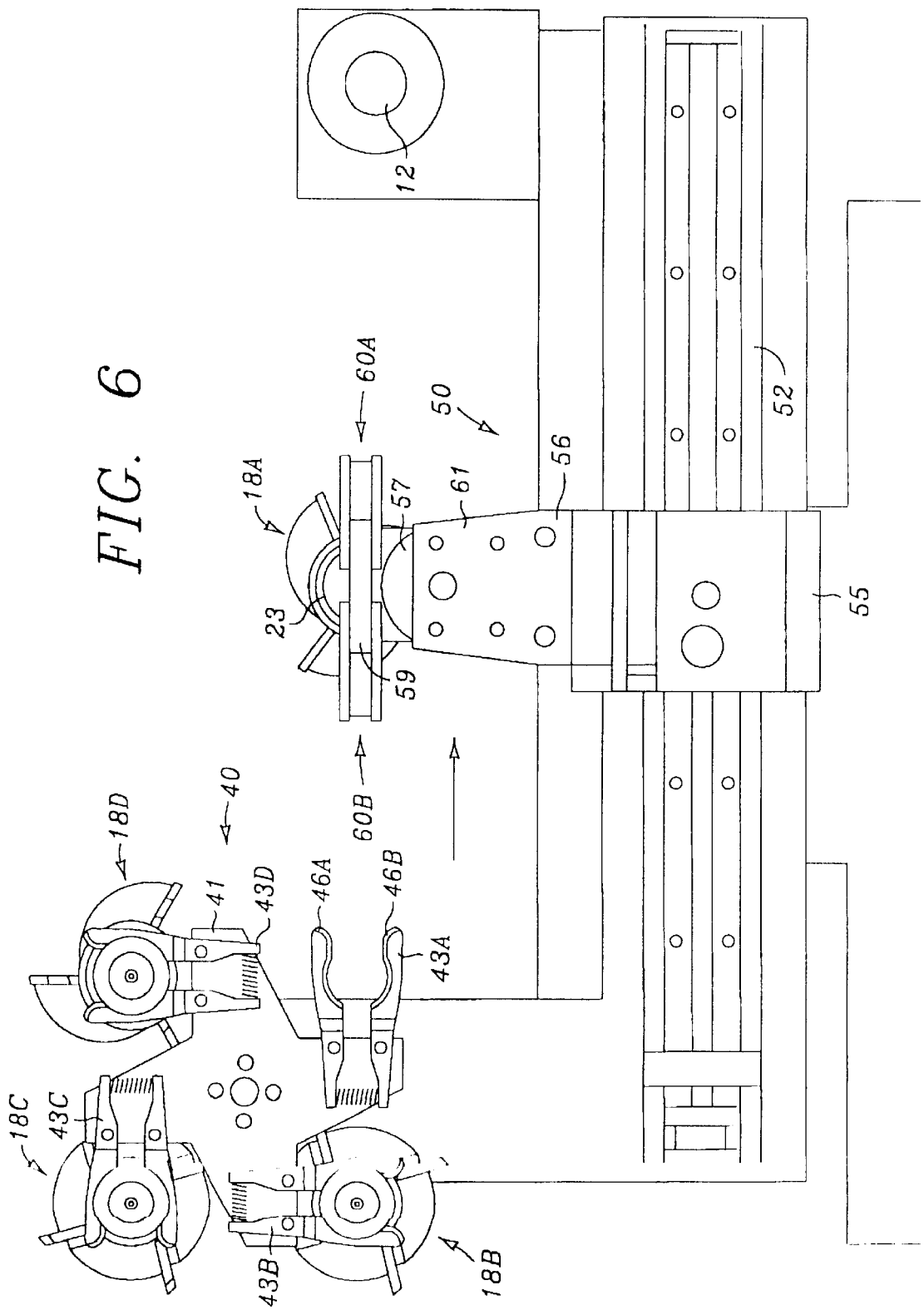
FIG. 6 is a representative top view of a tool storage system and a tool assembly held by a tool transport system.

Referring to FIGS. 4 through 6, tool storage system 40 is shown including turret 41. Turret 41 is supported by and rotates on turret shaft 42. As seen in FIG. 6, turret 41 includes a plurality of tool clamps 43A through 43D attached to and extending from turret 41. As seen in FIG. 6, tool storage system 40 is shown supporting tool assemblies 18B, 18C and 18D in tool clamps 43B, 43C and 43D. FIGS. 1, 4 and 5 show rotary actuator 45 connected to turret shaft 42 for advancing turret 41. FIG. 6 shows turret 41 advancing to a selected orientation to present a selected tool clamp 43A from which tool assembly 18A has been removed by tool transport system 50.

Referring to FIGS. 2 through 14, tool transport system 50 will be described in further detail. FIGS. 2 through 14 show tool transport system 50 including carriage 51 to which primary frame 55 is attached. Carriage 51 is propelled in either a forward direction F or reverse direction R along an X axis by horizontal travel actuator 52. As shown, horizontal travel actuator 52 is configured as a rodless cylinder. Carriage 51 travels in response to the travel of a piston of the rodless cylinder and a magnetic attraction between the piston of the rodless cylinder and carriage 51.

Tool transport system 50 also includes primary frame 55 connected to carriage 51. As shown in FIGS. 4, 9, 10 and 12, primary frame 55 supports lifting cylinder 53. Head frame assembly 56 is attached to lifting cylinder 53 and is movable with the travel of lifting cylinder 53 along a Y axis. Clamping arm cylinder 57 is attached to head frame 61. Clamping arm cylinder 57 supports clamp arm frame 59. As seen in FIGS. 5, 7, 8, 11, 13, and 14, first and second head frame arms 63A and 63B are attached to and extend forward from head frame assembly 56. Second head frame arm 63B, similar to first head frame arm 63A, is also shown to advantage in FIGS. 4 and 9.

Figure 11:
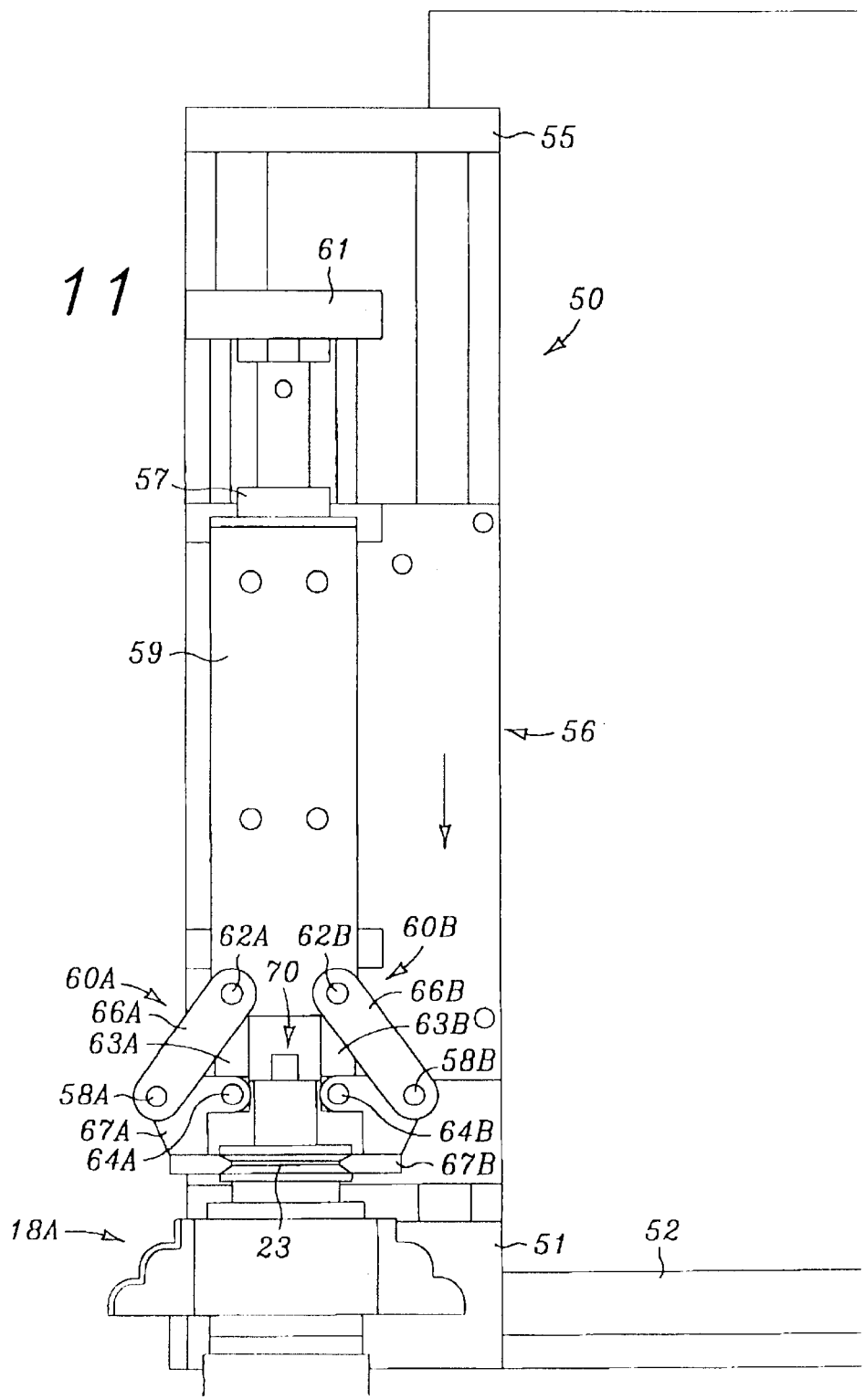
FIG. 11 is a representative front view of a tool assembly positioned on a spindle and an hydraulic coupler coupled to the hydrostatic tool holder.
Figure 13:
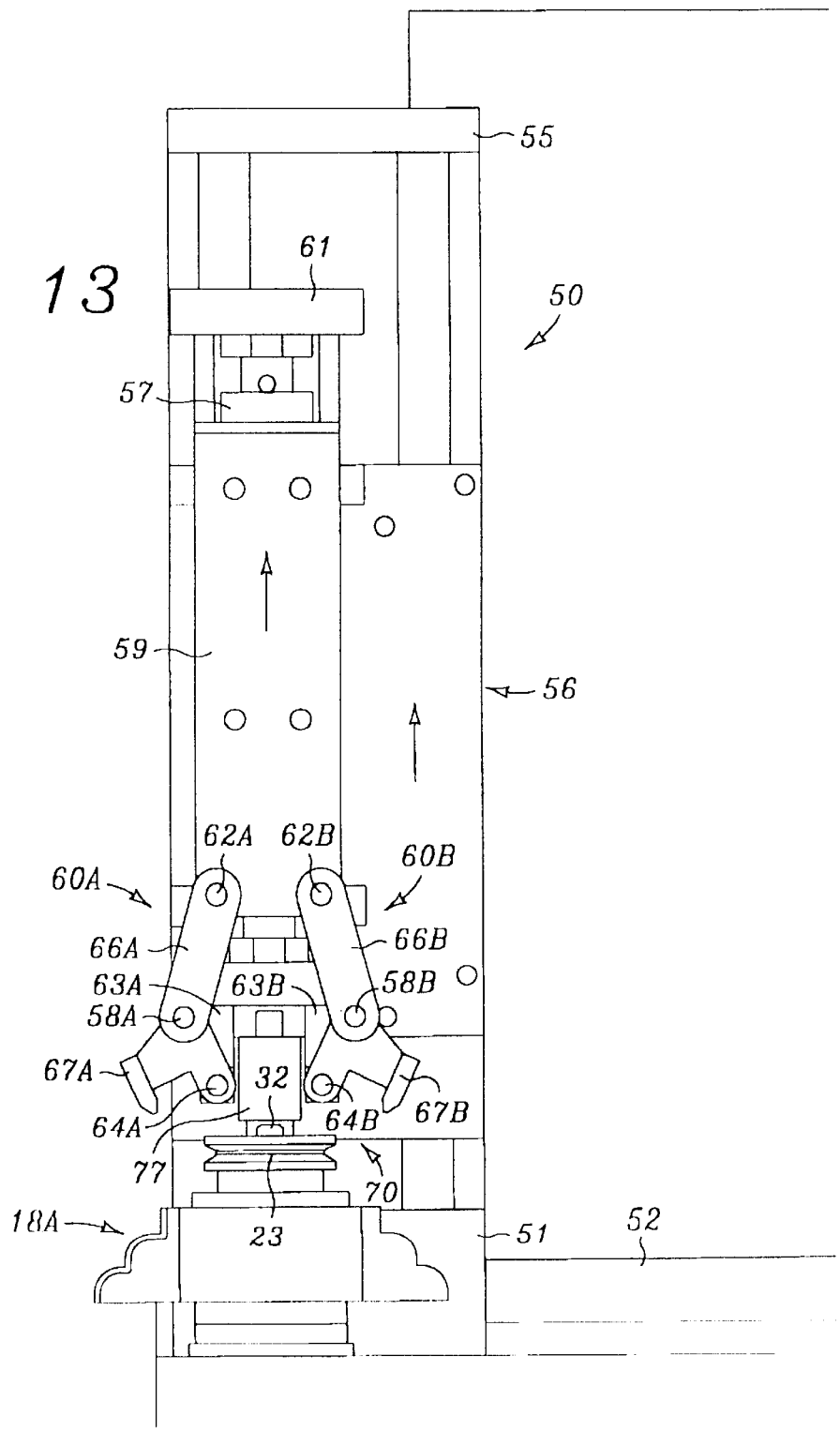
FIG. 13 is a representative front view of a tool assembly positioned on a spindle and released by the tool transport system.

Tool transport system 50 also includes first and second articulated clamping arms 60A and 60B. As seen in FIGS. 7, 8, 11, 13, and 14, first and second articulated clamping arms 60A and 60B include upper sub-arms 66A and 66B and lower sub-arms 67A and 67B. Upper sub-arms 66A and 66B are pivotably connected to lower sub-arms 67A and 67B at connector pivot points 58A and 58B. Upper ends of first and second articulated clamping arms 60A and 60B are pivotably connected to clamp arm frame 59 at clamp arm pivot points 62A and 62B. Lower ends of first and second lower sub-arms 67A and 67B are pivotably connected to first and second head frame arms 63A and 63B at clamp arm pivot points 64A and 64B. In the embodiment shown, gripping articulation between the lower ends of lower sub-arms 67A and 67B is achieved when clamping arm cylinder 57 travels down as shown in FIG. 11. Release of gripping articulation between the lower ends of lower sub-arms 67A and 67B occurs when clamping arm cylinder 57 is actuated for travel in an upward direction as shown in FIG. 13.

Figure 15:
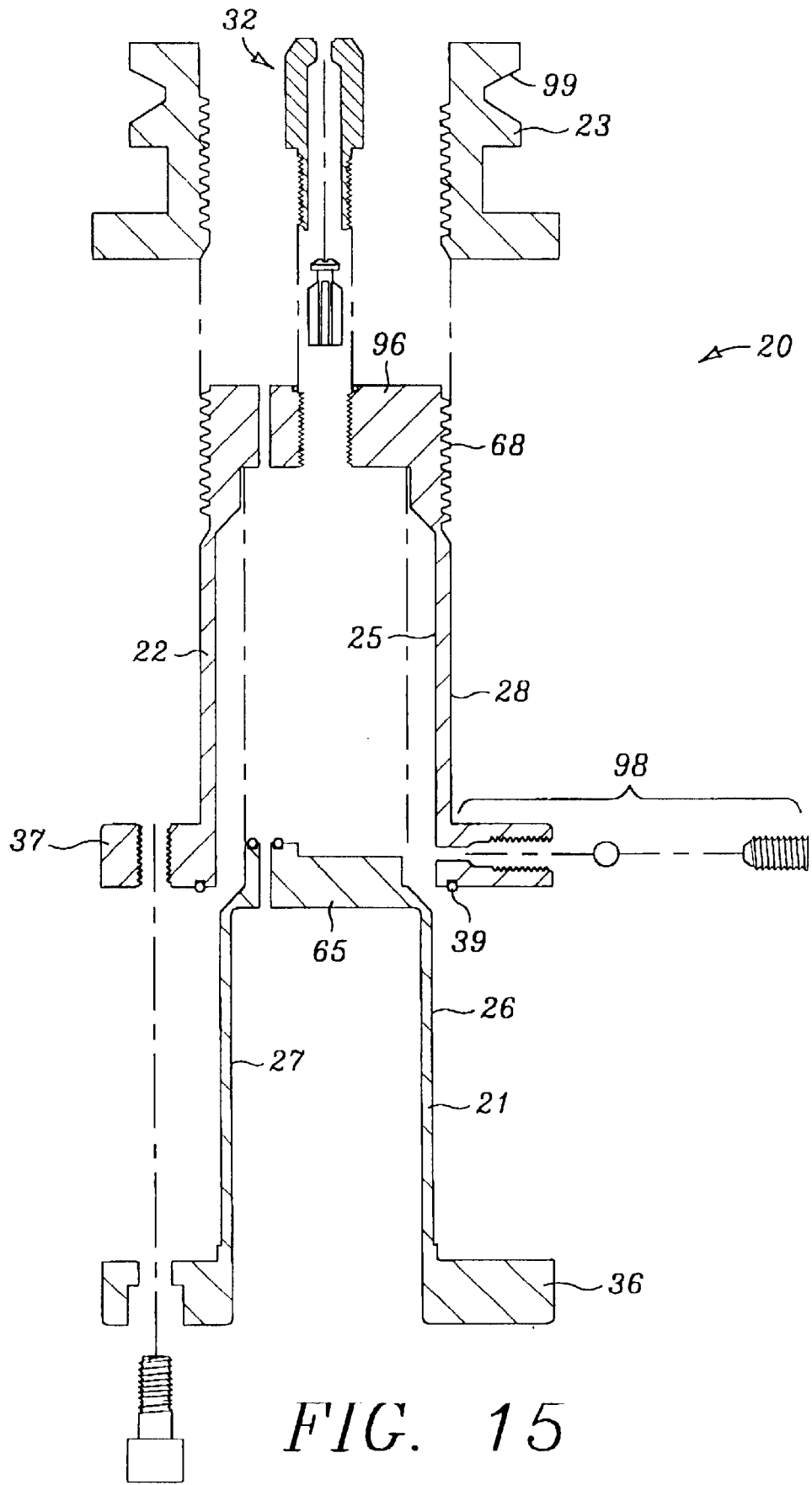
FIG. 15 is a representative exploded side cutaway view of a hydrostatic tool holder.

Referring to FIG. 15, hydrostatic tool holder 20 includes inner sleeve 21 nested within outer sleeve 22. Collar 23 is threadedly engageable with outer sleeve threaded end 68. Hydraulic fitting 32 is threadedly engageable with outer sleeve bulkhead 96.

Figure 16:
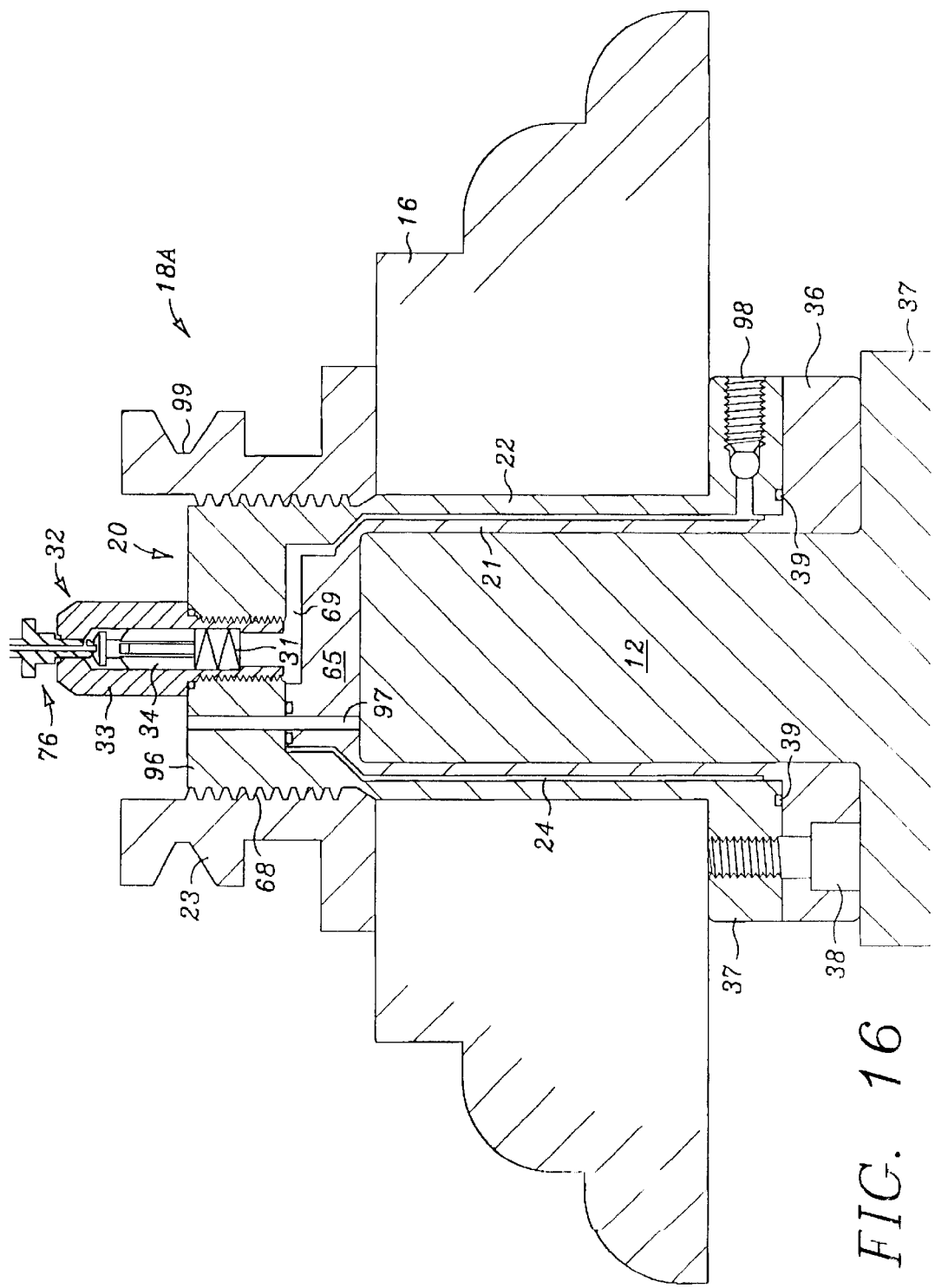
FIG. 16 is a representative assembled side cutaway view of a tool assembly including a hydrostatic tool holder.
Figure 18:
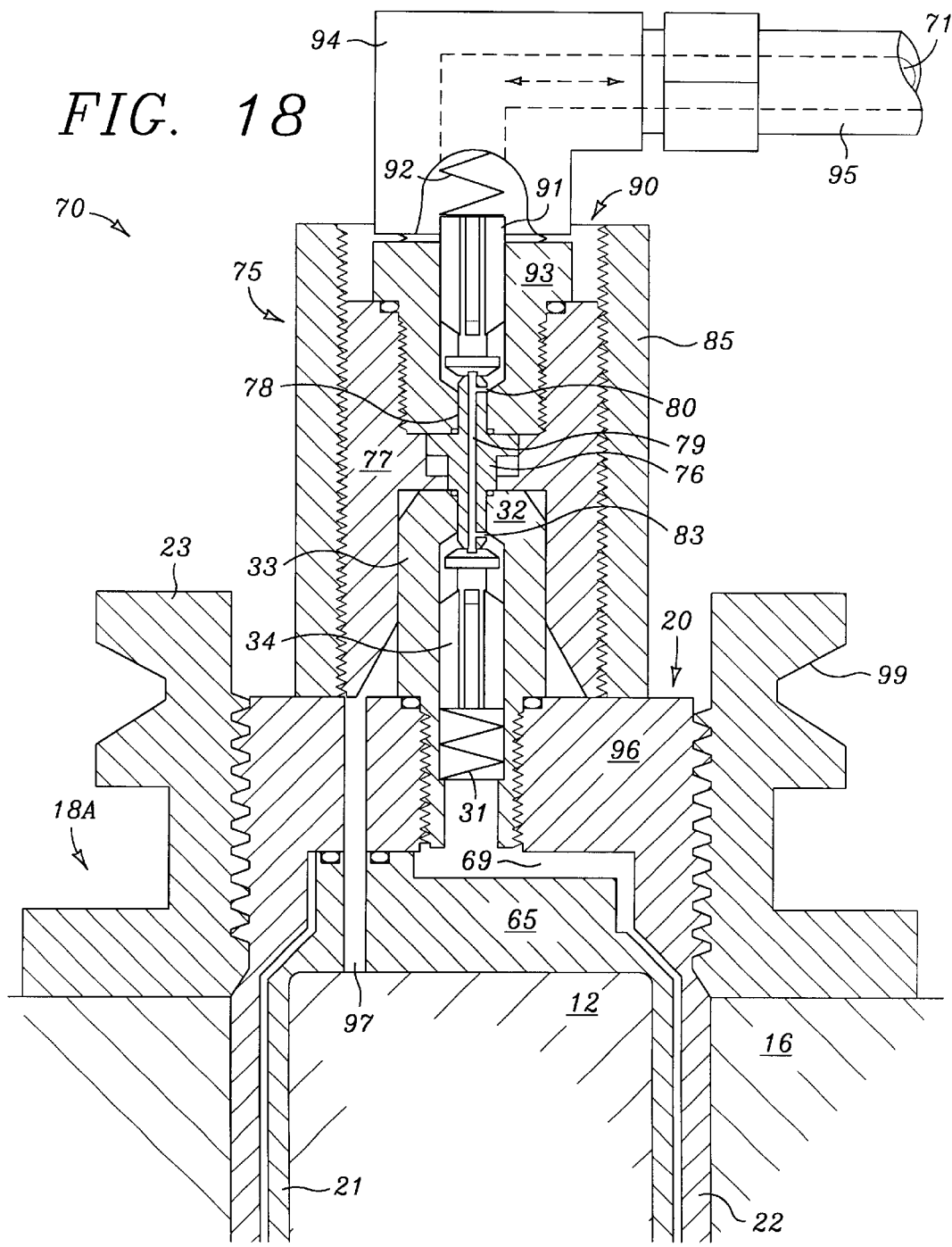
FIG. 18 is a representative side cutaway view of an hydraulic coupler coupled to the hydraulic fitting of a hydrostatic tool holder.
Figure 19:
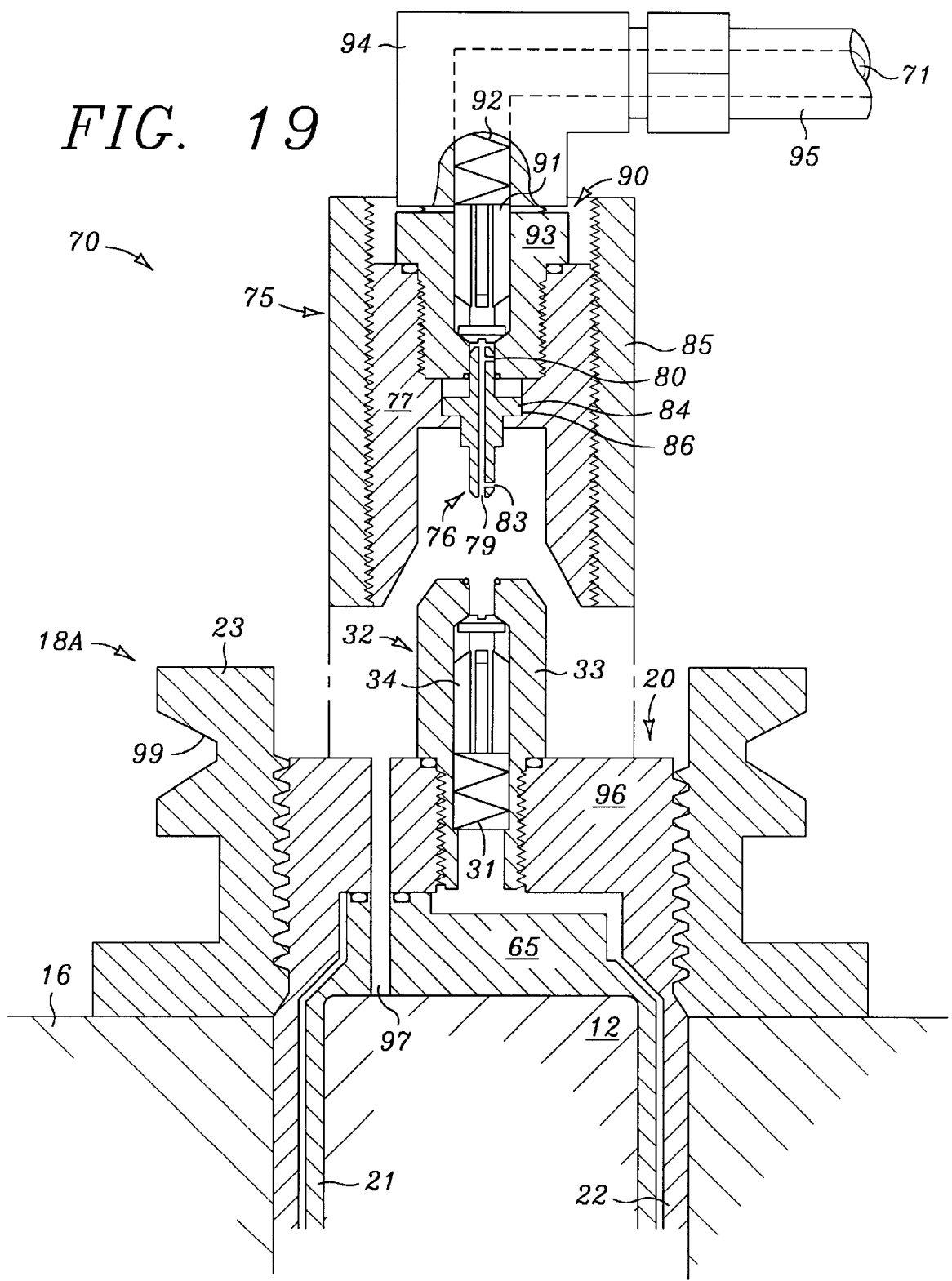
FIG. 19 is a representative side cutaway view of an hydraulic coupler disengaged from the hydraulic fitting of an hydrostatic tool holder.

Referring to FIG. 16, tool assembly 18A includes hydrostatic tool holder 20 having inner sleeve 21 nested within outer sleeve 22 forming gap 24. Chamber 69 is defined by gap 24 between outer circumferential surface 26, shown in FIG. 15, of inner sleeve 21 and inner circumferential surface 25, shown in FIG. 15, of outer sleeve 22. Collar 23 includes gripping flange 99 which provides a gripping and lifting member for gripping, lifting, supporting and placing tool assembly 18A. Hydraulic fitting 32 is threadedly engageable with outer sleeve bulkhead 96. Chamber 69 is further defined by the nesting and mating configuration of inner sleeve flange 36 and outer sleeve flange 37, which are sealed against pressure loss by o-ring 39 and are connected by screw 38, as shown in FIG. 16. Referring to FIGS. 16, 18 and 19, chamber 69 is further defined by the nesting and mating configuration of inner sleeve bulkhead 65 formed at upper end of inner sleeve 21 and outer sleeve bulkhead 96 formed at upper end of outer sleeve 22. Bleed hole 97 extends through inner sleeve bulkhead 65 and outer sleeve bulkhead 96. Relief port assembly 98 provides a means for manually releasing hydrostatic pressure from hydrostatic tool holder 20 if required.

Inner sleeve 21 includes inner bore 27, as shown in FIG. 15, which is configured to concentrically engage spindle 12, as shown in FIG. 16. As shown in FIG. 15, outer sleeve 22 includes outer circumferential surface 28 configured to concentrically engage cutting tool 16, as shown in FIG. 16. Inner sleeve 21 and outer sleeve 22 deflect when hydraulic pressure is exerted within chamber 69 to firmly engage both spindle 12 and cutting tool 16.

Hydraulic fluid 35 may be introduced into and pressurized within chamber 69 through hydraulic fitting 32. In one preferred embodiment of the invention, outer sleeve 22 includes hydraulic fitting 32 which permits introduction, pressurization and extraction of hydraulic fluid 35 into chamber 69. In the embodiment shown in FIG. 16, hydraulic fitting 32 is configured as hydraulic test point 33 including poppet valve 34 and poppet spring 31 which biases poppet valve 34 towards a closed position. Hydraulic test point 33 is configured to releasably engage and hydraulically communicate with hydraulic coupler 70, as shown in FIGS. 17–19.

Referring to FIGS. 16, 18 and 19, hydrostatic tool holder 20 includes collar 23 including gripping flange 99 which provides a gripping and lifting member for gripping, lifting, supporting and placing tool assembly 18A. Gripping flange 99 is configured for engagement with first and second articulated clamping arms 60A and 60B of tool transport system 50, as shown in FIG. 5, and first and second opposing fingers 46A and 46B of tool clamp 43A of tool storage system 40, as shown in FIG. 6.

As seen in FIGS. 10 through 14, hydrostatic tool system 10 includes hydraulic coupler 70. As shown in FIG. 17, hydraulic coupler 70 hydraulically communicates with hydraulic pump 73 for hydraulic fluid 35. Referring to FIGS. 17 through 19, poppet actuator assembly 75 allows transfer of hydraulic fluid 35 from hydraulic pump 73 to and from hydrostatic tool holder 20.

Figure 17:
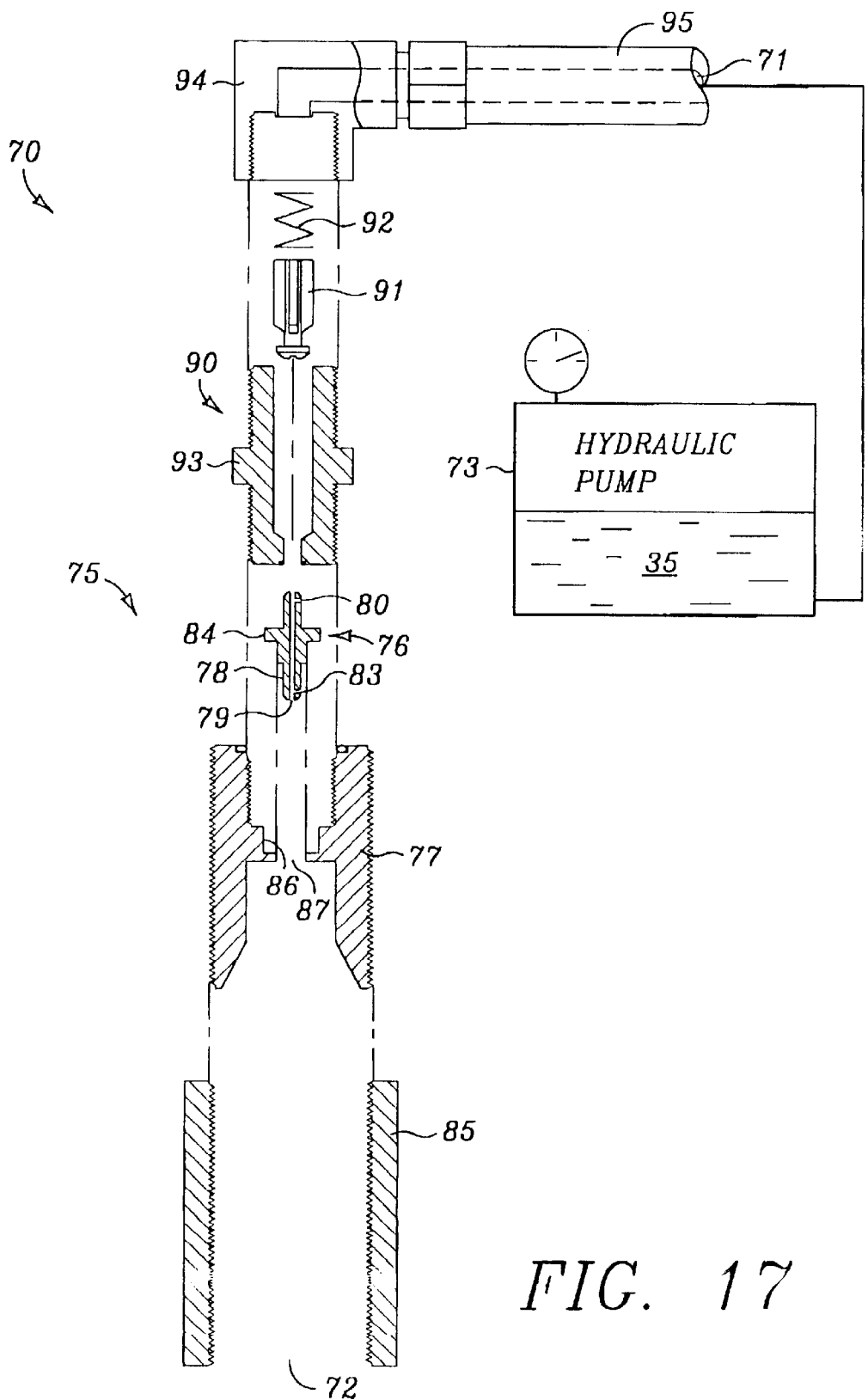
FIG. 17 is a representative exploded side cutaway view of an hydraulic coupler.

Referring to FIGS. 17 through 19, hydraulic coupler 70 includes poppet actuator assembly 75 including poppet actuator 76 inserted within actuator cap 77. As shown in FIG. 17, poppet actuator 76 is configured having stem 78 having center bore 79. Stem 78 includes first orifice 80 which extends through a side wall of stem 78 at or near a first end of stem 78 and hydraulically communicating with center bore 79. Stem 78 also includes second orifice 83 which extends through a side wall of stem 78 at or near a second end of stem 78 and hydraulically communicating with center bore 79. Stem 78 extends longitudinally through seal 84 which seats in actuator cap 77. Actuator cap 77 includes actuator cap center bore 87 including actuator cap seat 86 for receiving seal 84.

Figure 10:
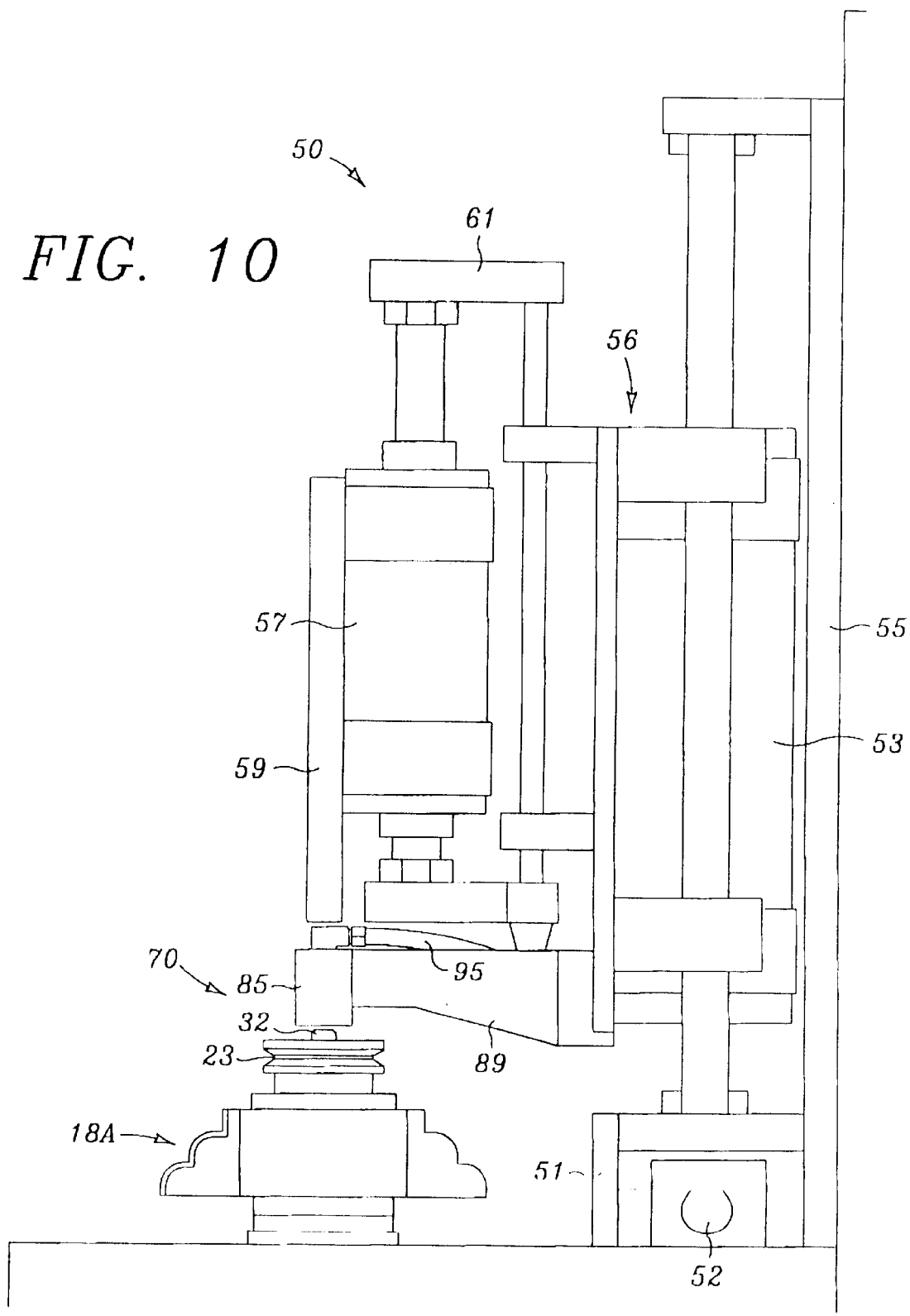
FIG. 10 is a representative side view of a tool assembly positioned on a spindle.
Figure 12:
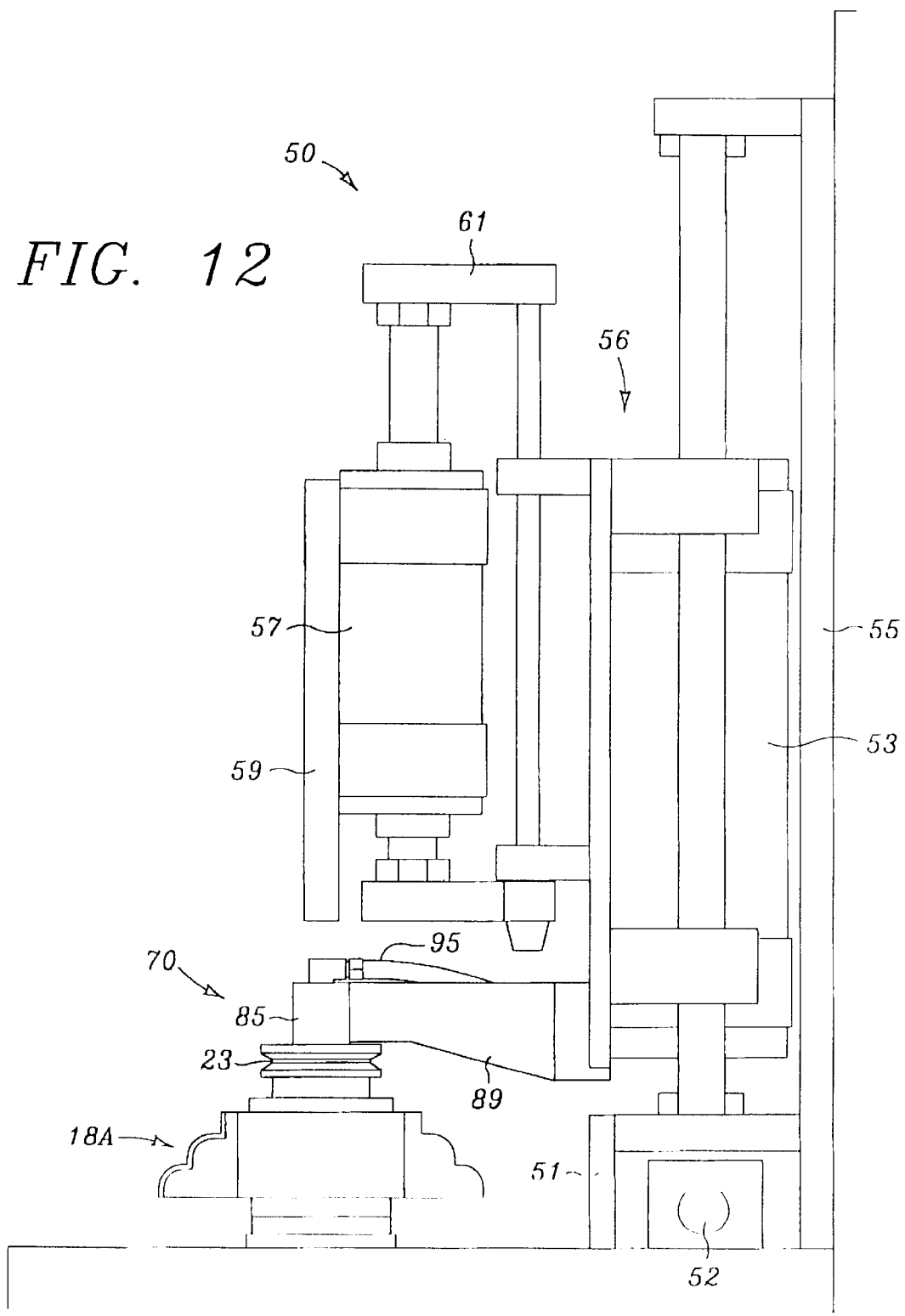
FIG. 12 is a representative side view of a tool assembly positioned on a spindle and an hydraulic coupler coupled to the hydrostatic tool holder.

Referring to FIGS. 17 through 19, poppet actuator assembly 75 also includes hydraulic test point 90 including poppet valve 91 slideably disposed within test point housing 93. Poppet valve 91 includes poppet valve spring 92 which biases poppet valve 91 towards a closed position. Hydraulic test point 90 is oriented such that poppet valve 91 opens against pressure exerted by poppet actuator stem 78 permitting passage of hydraulic fluid 35 past poppet valve 91. Ninety degree elbow 94 is attached at the end of flexline 95 which attaches to an inlet end of test point housing 93. Flexline 95 attaches at a second end to hydraulic pump 73 for hydraulic fluid 35. Test point housing 93 threadedly engages actuator cap 77 and actuator cap 77 threadedly engages actuator cap housing 85. As shown in FIGS. 10 and 12, actuator cap housing 85 attaches to arm 89, which in turn is attached to and extends from head frame assembly 56 and moves in substantially vertical upward and downward travel along the Y axis with travel of lifting cylinder 53. Referring to FIGS. 18 and 19, hydrostatic tool holder 20 is shown positioned on spindle 12 and hydraulic coupler 70 is shown together with the upper coupling portion of tool assembly 18A, specifically, hydraulic fitting 32 of hydrostatic tool holder 20.

In the preferred embodiment of the invention, and referring to FIG. 20, system controller 100 includes processing device 110 and input 102. Power source 103 provides power as needed to the various systems. System controller 100 operates and controls various functions, devices, assemblies and systems of hydrostatic tool system 10 including compressor 104. System controller 100 controls selection of cutting tool assembly 18 by actuation of turret drive 45, shown in FIGS. 1, 4 and 5, and rotation of turret 41, shown in FIGS. 1, 4, 5 and 6. System controller 100 controls horizontal travel of carriage 51, shown in FIGS. 1–14, by actuation and control of horizontal travel actuator 52, shown in FIGS. 1 through 14, and travel, actuation and control of lifting cylinder 53, shown in FIGS. 4, 9,10 and 12, and clamping arm cylinder 57, shown in FIGS. 1 through 14, and thereby the gripping articulation between the lower ends of lower sub-arms 67A and 67B, shown in FIGS. 7, 8, 11, 13 and 14, when clamping arm cylinder 57 extends or retracts, and the raising and lowering of tool assembly 18, shown in FIGS. 1 through 14, and hydraulic coupler 70, shown in FIGS. 10 through 14. System controller 100 also controls energization of hydraulic pump 73, operation of spindle drive motor 13 and operation of any associated workpiece feed mechanism, (not shown). System controller 100 may be configured as a stand alone or a networked personal computing device.

As previously mentioned, FIGS. 2 through 14 depict a sequence of the following steps involving the referenced assemblies and systems: tool assembly 18A supported in tool storage system 40 for retrieval by tool transport system 50, (FIGS. 2 through 4); tool assembly 18A is held by first and second articulated clamping arms 60A and 60B for transport to spindle 12, (FIGS. 5 through 7); and tool assembly 18A placed on spindle 12 by tool transport system 50 (FIGS. 8 through 14).

In operation, a plurality of cutting tool assemblies 18 are stored for selection and use at tool storage system 40. Tool storage system 40 includes turret 41 mounted on turret shaft 42. As seen in FIG. 6, turret 41 includes a plurality of tool clamps 43A through 43D attached to and extending from turret 41. Tool storage system 40 is shown supporting tool assemblies 18A, 18B and 18C in tool clamps 43A, 43B and 43C. FIG. 1 shows rotary actuator 45 connected to turret shaft 42 for advancing turret 41 to a selected orientation to present a selected tool assembly 18 for pickup by tool transport system 50, or a selected tool clamp 43A through 43D for placement or storage of tool assembly 18 by tool transport system 50. Tool selection is made by controller 100. Turret 41 is rotated by operation of turret drive 45 as required to position a selected cutting tool assembly 18 for picking and transport.

Figure 2:
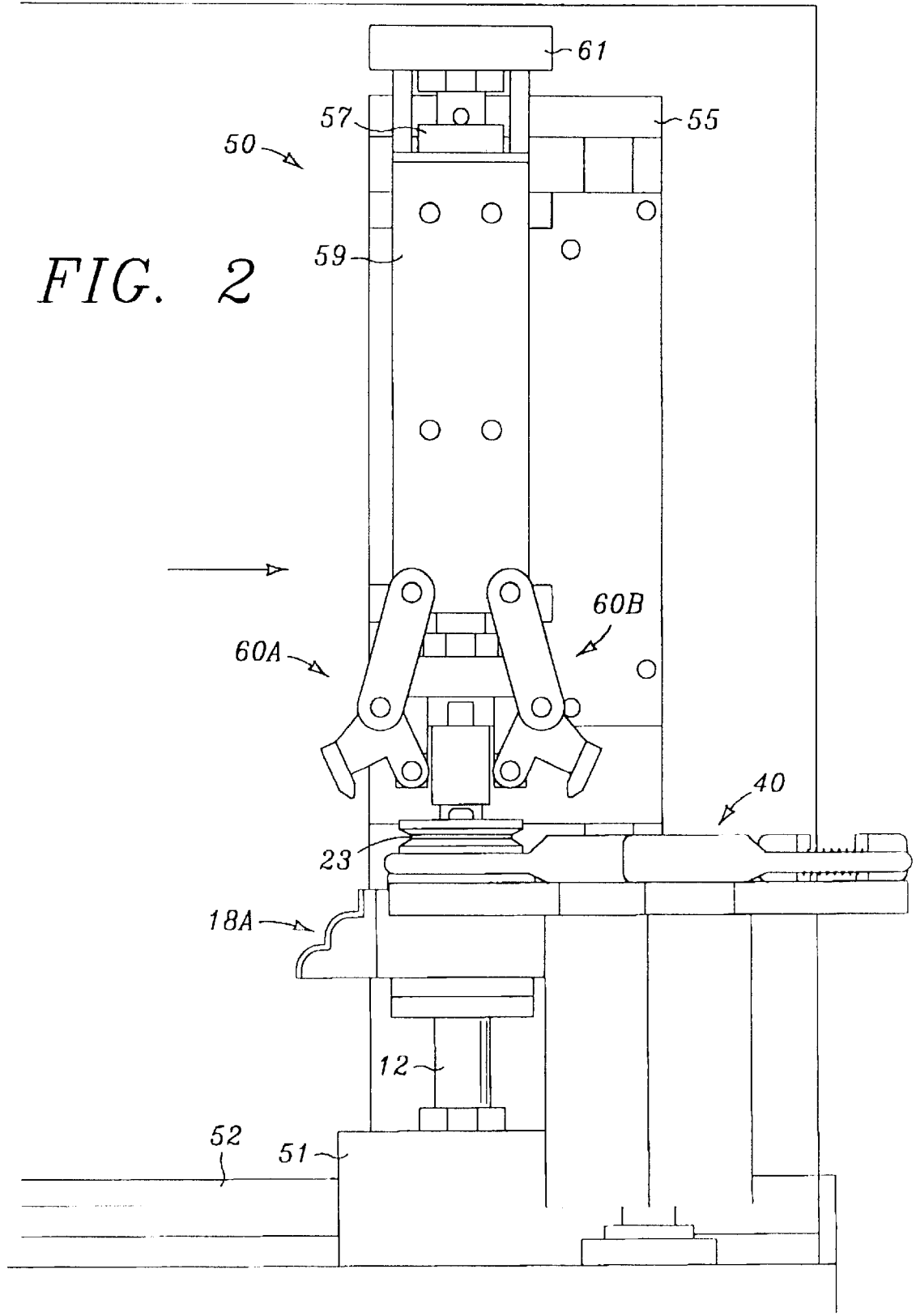
FIG. 2 is a representative front view of a tool assembly held by a tool storage system and a tool transport system.

Referring to FIG. 4, primary frame 55 is propelled along carriage 51 in an X axis towards tool storage system 40. Referring to FIG. 2, tool transport system 50 has positioned first and second articulated clamping arms 60A and 60B directly above collar 23 of the selected cutting tool assembly 18A.

Figure 3:
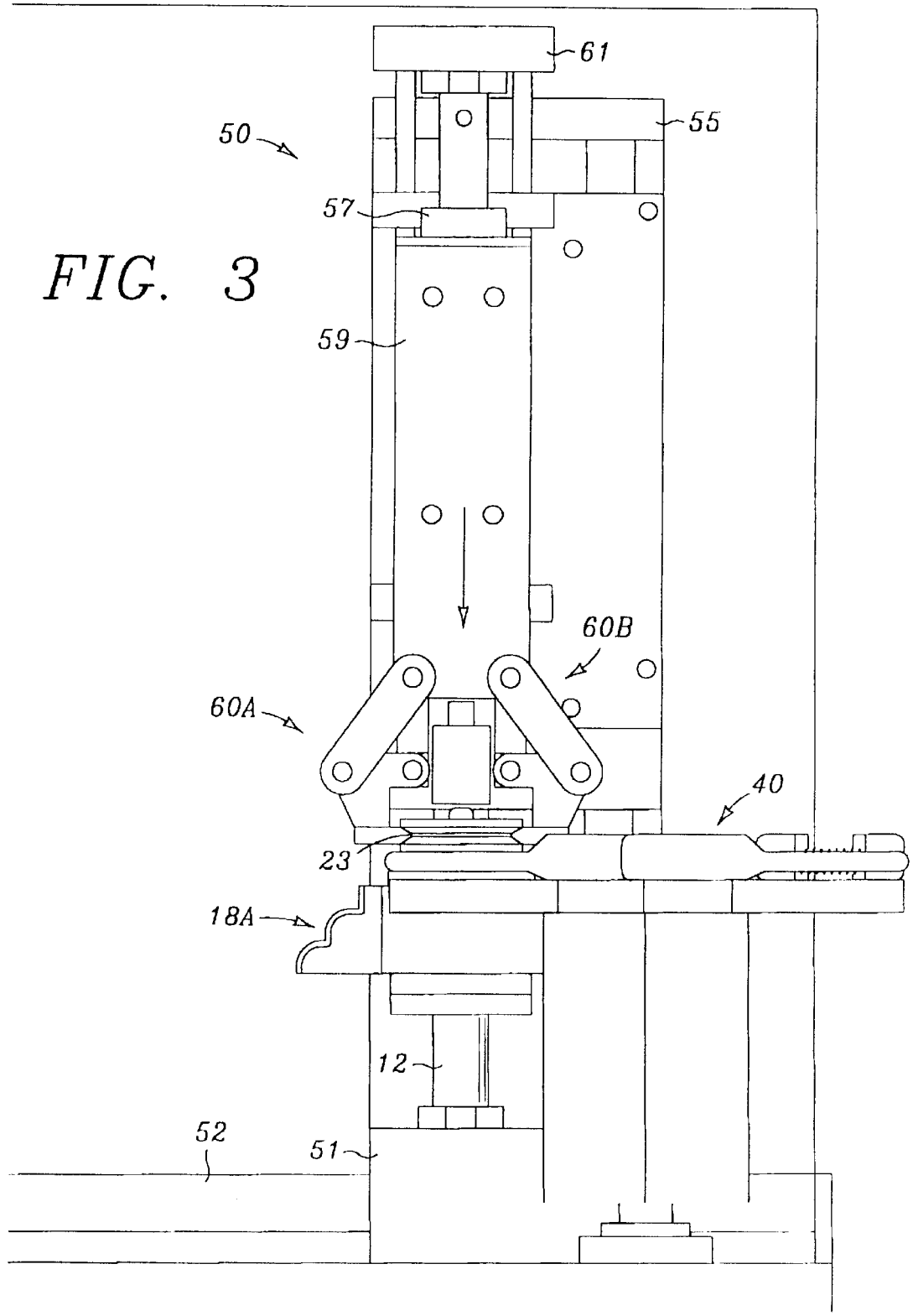
FIG. 3 is a representative front view of a tool assembly held by a tool storage system and a tool transport system.

Referring to FIGS. 3 and 4, first and second articulated clamping arms 60A and 60B have achieved gripping articulation about collar 23 of the selected cutting tool assembly 18A. Gripping articulation is achieved by first and second articulated clamping arms 60A and 60B, shown in FIGS. 1 through 3, 5 through 8, 11, 13 and 14, by movement of clamping arm cylinder 57, shown in FIGS. 1 through 14, in a downward direction. Clamp arm frame 59, shown in FIGS. 2 through 14, and which is attached to clamping arm cylinder 57, also moves in a downward direction relative to first and second head frame arms 63A and 63B, shown in FIGS. 5, 7, 8, 11, 13 and 14, applying a downward force to upper sub-arms 66A and 66B, shown in FIGS. 7, 8, 11, 13 and 14, which are pivotably connected to lower sub-arms 67A and 67B, shown in FIGS. 7, 8, 11, 13 and 14, at connector pivot points 58A and 58B, shown in FIGS. 7, 8, 11, 13 and 14.

Figure 7:
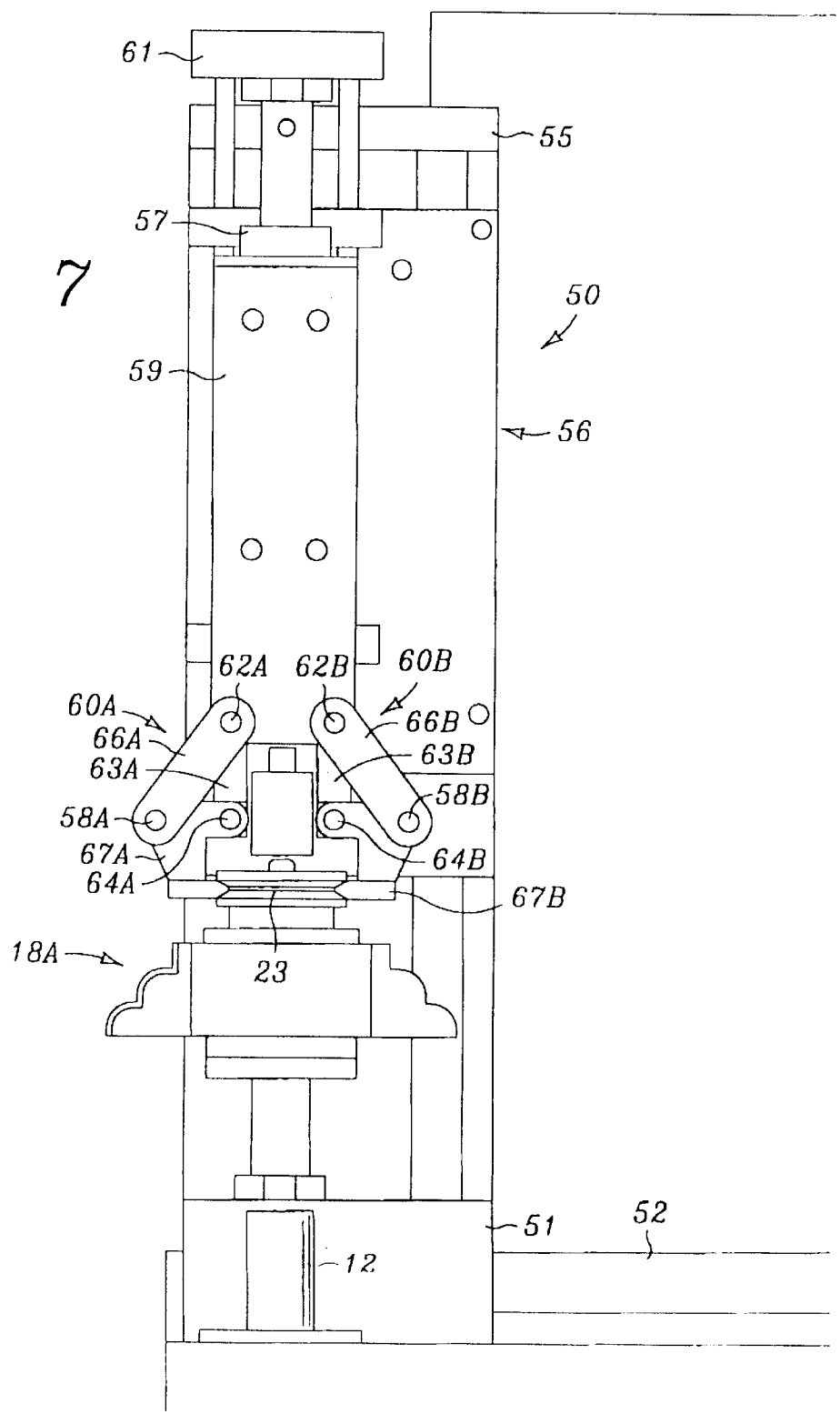
FIG. 7 is a representative front view of a tool assembly held by a tool transport system and positioned for placement on a spindle.

Referring to FIGS. 5 through 7, once selected cutting tool assembly 18A is grasped by first and second articulated clamping arms 60A and 60B, carriage 51 initiates movement away from turret 41. Carriage 51 continues travel until cutting tool assembly 18A is positioned over spindle 12 as shown in FIG. 7.

Figure 8:
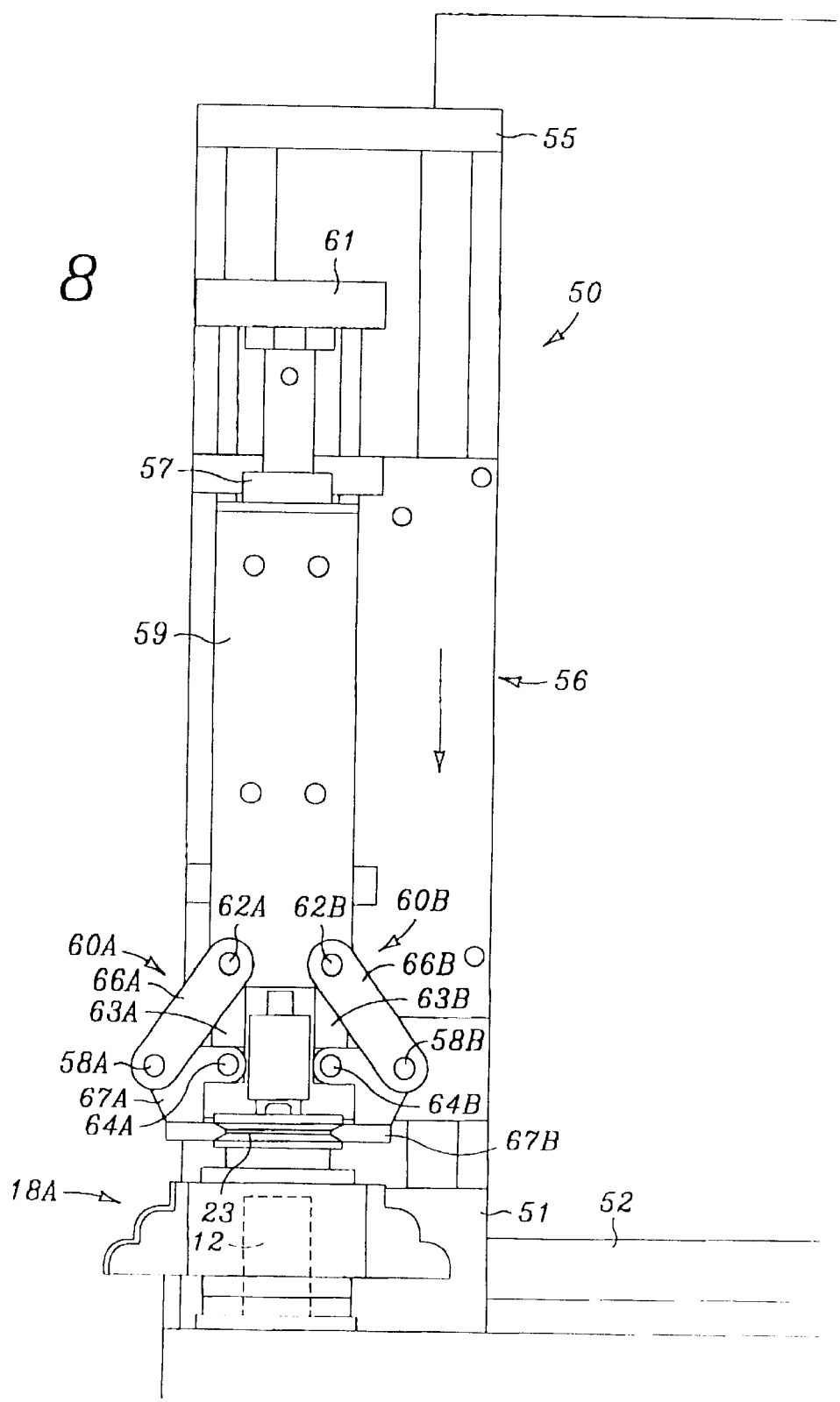
FIG. 8 is a representative front view of a tool assembly held by a tool transport system being positioned for placement on a spindle.
Figure 9:
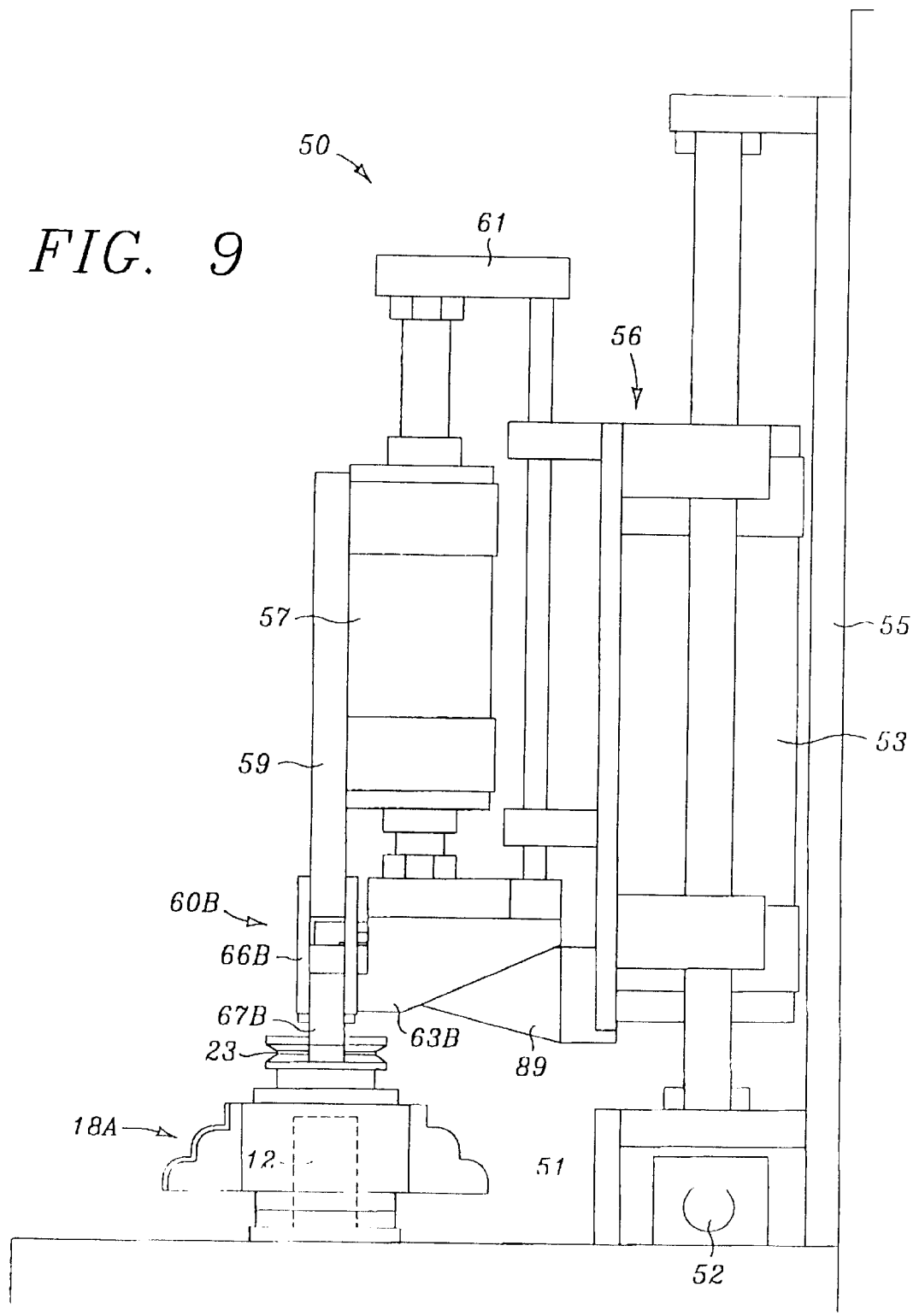
FIG. 9 is a representative side view of a tool assembly held by a tool transport system being positioned for placement on a spindle.

Referring to FIGS. 8 and 9, cutting tool assembly 18A is lowered along the Y axis and placed on spindle 12 by actuation of lifting cylinder 53. As seen in FIG. 9, lifting cylinder 53 lowers and the connected head frame assembly 56 lowers as well, setting tool assembly 18A on spindle 12.

Referring to FIGS. 10 through 12, head frame assembly 56 continues downward travel by operation of lifting cylinder 53 and hydraulic coupler 70 is moved into coupling engagement with hydraulic fitting 32 of cutting tool assembly 18A.

Referring to FIG. 18, hydraulic coupler 70 is shown engaging hydraulic fitting 32 of hydrostatic tool holder 20.

FIG. 18 is typical of coupling engagement for the purpose of either energizing or de-energizing hydrostatic tool holder 20. Opposing ends of poppet actuator stem 78 act against hydraulic test point 33 and poppet valve 34 of hydrostatic tool holder 20 and poppet valve 91 of poppet actuator assembly 75 opening poppet valves 34 and 91 to permit flow of hydraulic fluid 35 from hydraulic pump 73 through hydraulic coupler 70 to hydrostatic tool holder 20. As shown in FIG. 18, when hydraulic coupler 70 is engaged to hydraulic fitting 32 as shown, hydraulic communication is permitted between hydraulic pump 73 for hydraulic fluid 35, shown in FIG. 17, and chamber 69 of hydrostatic coupler 20, shown in FIG. 18, through first orifice 80, second orifice 83 and center bore 79 of stem 78.

Figure 14:
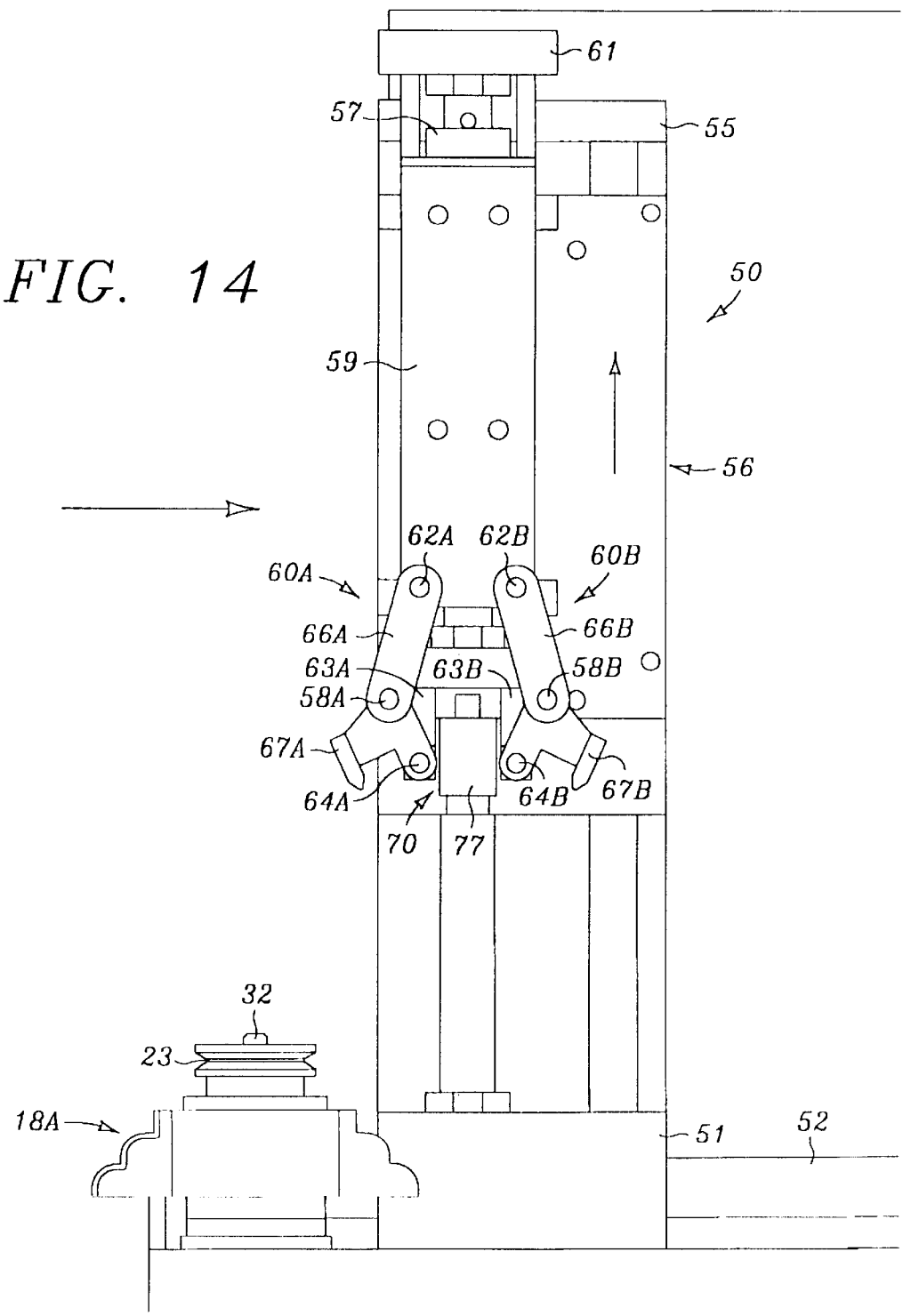
FIG. 14 is a representative front view of a tool assembly positioned on a spindle and released by the tool transport system.

Following hydrostatic energization of hydrostatic tool holder 20, hydraulic coupler 70 is lifted away from hydraulic fitting 32 of tool holder 20, as shown in FIG. 19, by vertical up movement of lifting cylinder 53, as shown in FIGS. 13 and 14. Gripping articulation between the lower ends of lower sub-arms 67A and 67B is released as clamping arm cylinder 57 moves vertically up, as shown in FIG. 13, releasing collar 23 of cutting tool assembly 18A. First and second articulated clamping arms 60A and 60B lift away from collar 23 of cutting tool assembly 18A as lifting cylinder 53 continues upward travel, as shown in FIGS. 13 and 14.

Cutting tool assembly 18 is now ready for operation. A substantially reverse order operation is followed to remove, transport and store cutting tool assembly 18. To de-energize hydrostatic tool holder 20, hydraulic coupler 70 is moved into coupling engagement with hydraulic fitting 32 of hydrostatic tool holder 20. As this occurs, the opposing ends of poppet actuator stem 78 act against poppet valve 34 of hydrostatic tool holder 20 and poppet valve 91 of poppet actuator assembly 75 opening valves 34 and 91, permitting flow of hydraulic fluid 35 from the hydrostatic tool holder 20 through hydraulic coupler 70.

Figure 21:
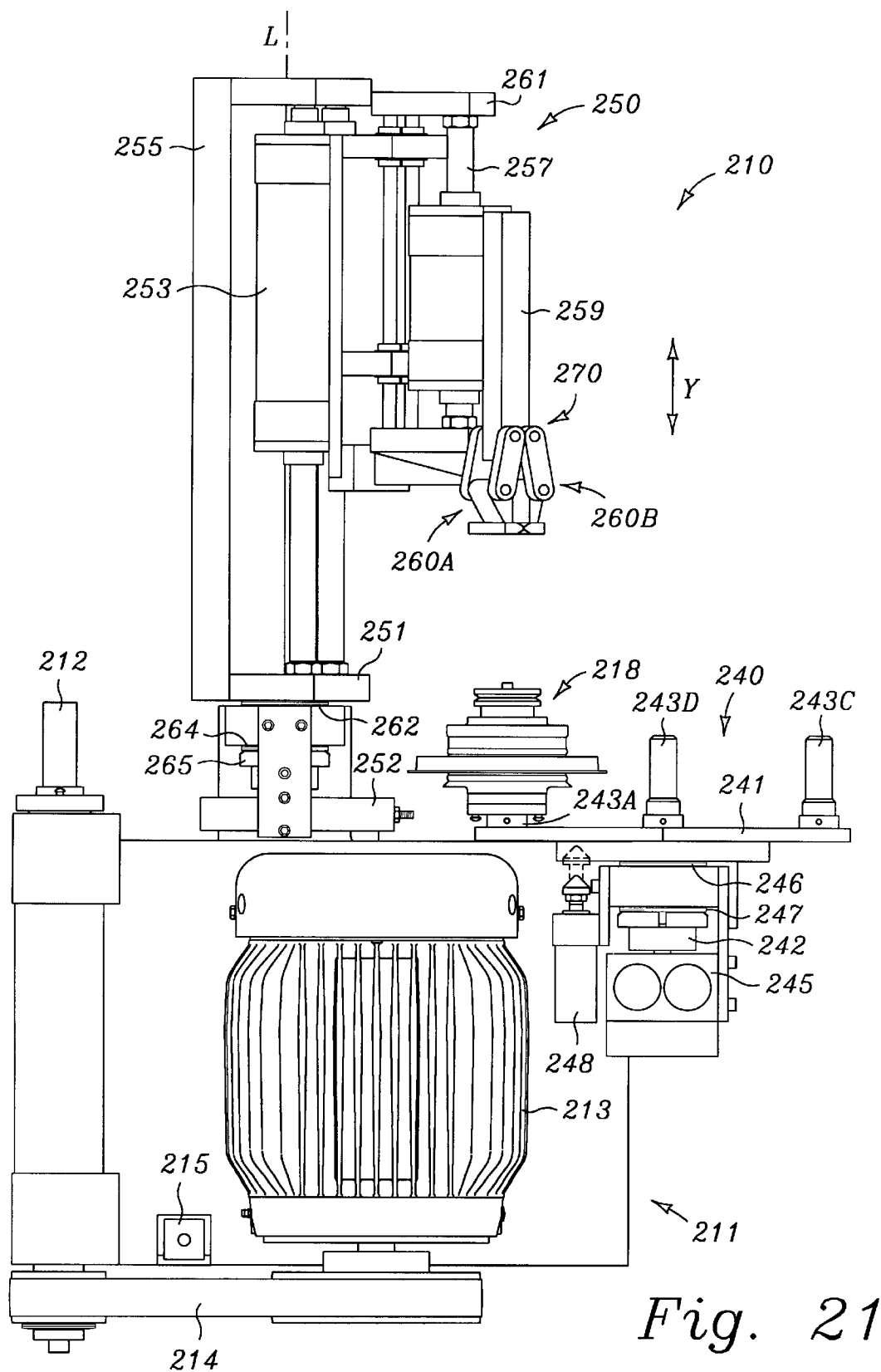
FIG. 21 is a representative front view of a hydrostatic tool system.

Referring to FIGS. 21 through 24, another preferred embodiment of hydrostatic tool system 210 is shown to advantage. Hydrostatic tool system 210 is nearly identical to hydrostatic tool system 10 as shown in FIG. 1, with the exception that motion of tool transport system 250 is rotational as opposed to linear. Referring to FIG. 21, it will be seen that hydrostatic tool system 210 includes tool assembly 218, tool storage system 240, tool transport system 250, hydraulic coupler 270, and system controller 206. Hydrostatic tool system 210 also includes drive system 211 including spindle 212 connected to motor 213 by drive belt 214. Drive system 211 may also include tensioner 215 for tensioning drive belt 214.

Figure 22:
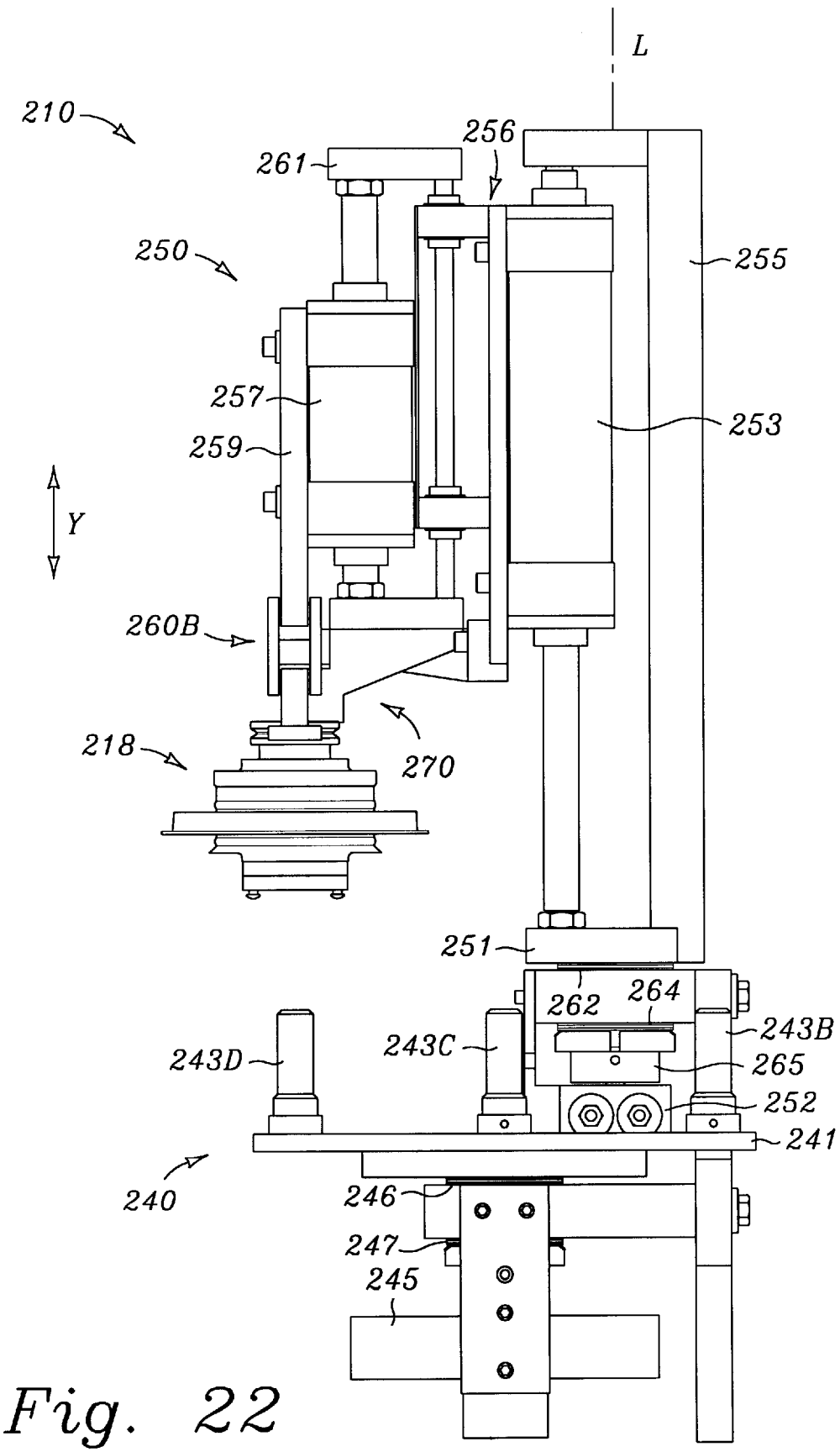
FIG. 22 is a representative side view of a hydrostatic tool system.
Figure 23:
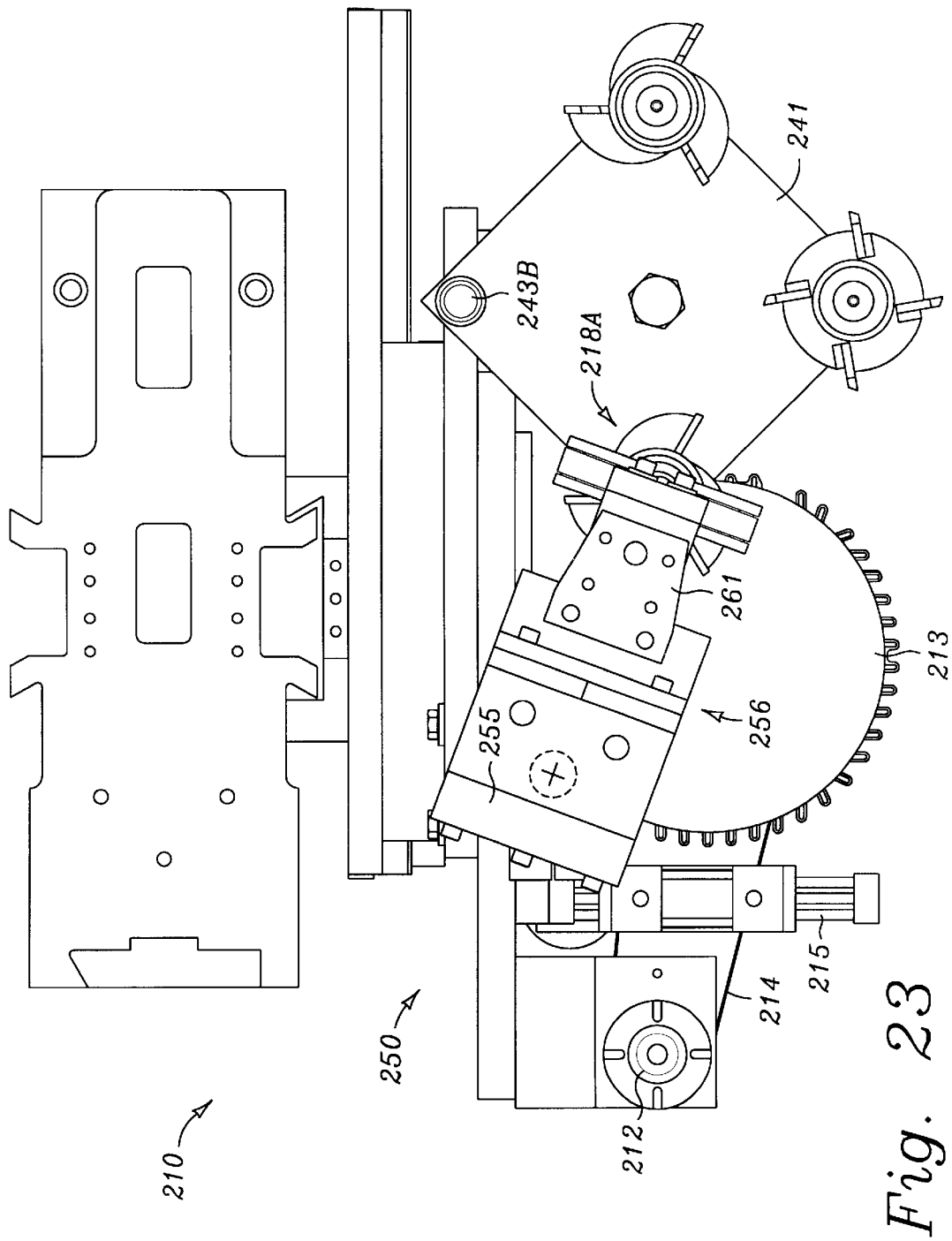
FIG. 23 is a representative top view of a hydrostatic tool system.
Figure 24:
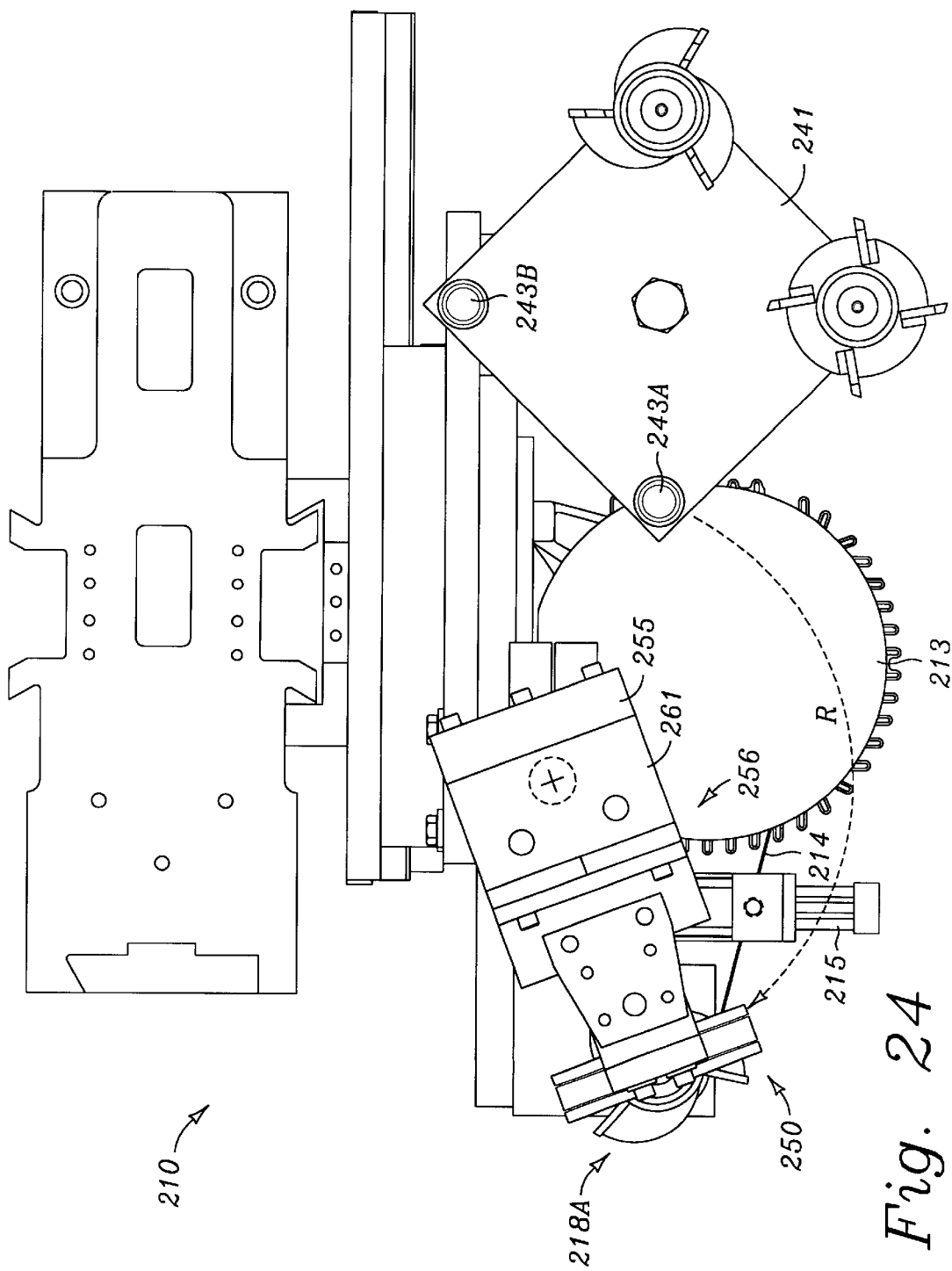
FIG. 24 is a representative top view of a hydrostatic tool system.

Tool storage system 240 is shown including turret 241. As seen in FIG. 21, turret 241 is supported by and rotates on turret shaft 242. Turret shaft 242 is supported by thrust bearings 246 and 247. As seen in FIGS. 23 and 24, turret 241 includes a plurality of "dummy" spindles 243A through 243D attached to and extending from turret 241. Preferably, dummy spindles 243A, seen in FIGS. 21 and 24, 243B, seen in FIGS. 22 through 24, 243C, seen in FIGS. 21 and 22 and 243D, seen in FIGS. 21 and 22, are undersized in circumference compared to spindle 212, shown in FIG. 21, to permit ease of placement of a tool assembly on the dummy spindle. Rotary actuator 245 is connected to turret shaft 242 for advancing turret 241 to a selected orientation to present a selected tool assembly 218A for removal from tool storage system 240 by tool transport system 250. Referring to FIG. 21, tool assembly 218A is shown supported on turret 241 located in position on "dummy" spindle 243A. Pneumatic stop cylinder 248, shown in FIG. 21, provides a means for stopping rotation of turret 241 at the selected location.

Referring to FIGS. 21 and 22, another preferred embodiment of tool transport system 250 is shown including carriage 251 to which primary frame 255 is attached. Carriage 251 is rotatable about a substantially vertical axis L, on shaft assembly 265, by transport system rotary actuator 252. Shaft assembly 265 is supported by thrust bearings 262 and 264. Carriage 251 is rotatable from a first position wherein clamping arms 260A and 260B are positioned over tool storage system 240, as seen in FIG. 23, and a second position wherein first and second articulated clamping arms 260A and 260B, shown in FIG. 21, are positioned over spindle 212, as seen in FIG. 24.

In the embodiment shown, rotary actuator 245 for tool storage system 240 and transport system rotary actuator 252 are configured as a pneumatic rotary actuator of the double rack and pinion gear type.

As shown in FIG. 22, tool transport system 250 also includes primary frame 255 connected to carriage 251. Primary frame 255 supports lifting cylinder 253. Head frame assembly 256 is attached to lifting cylinder 253 and is movable with the travel of lifting cylinder 253 along a Y axis. Clamping arm cylinder 257 is attached to head frame 261. Clamping arm cylinder 257 supports clamp arm frame 259. As seen in FIG. 21, tool transport system 250 also includes first and second articulated clamping arms 260A and 260B. In the embodiment shown, as with the previously described tool transport system 50, FIGS. 1 through 14, gripping articulation between clamping arms 260A and 260B is achieved when clamping arm cylinder 257 travels down. Release of gripping articulation occurs when clamping arm cylinder 257 is actuated for travel in an upward direction.

While this invention has been described with reference to the detailed embodiments, this is not meant to be construed in a limiting sense. Various modifications to the described embodiments as well as the inclusion or exclusion of additional embodiments will be apparent to persons skilled in the art upon reference to this description. It is therefore contemplated that the appended claims will cover any such modifications or embodiments as fall within the true scope of the invention.

We claim:

1. A hydrostatic tool system comprising:

a tool assembly including a hydrostatic tool holder, the tool assembly also including a cutting tool mounted on and secured by the hydrostatic tool holder;

a tool storage system including a plurality of tool assembly receivers for supporting one or more tool assemblies;

a tool transport system including a tool assembly pick and place device and a tool assembly transport device;

an hydraulic coupler associated with the tool transport system for pressurizing an hydraulic fluid into the hydrostatic tool holder; and a system controller connected to the tool storage system, the tool transport system and a motor driven spindle for controlling a selection of a tool assembly by the tool storage system, the picking, transporting and placement of the tool assembly by the tool transport system and operation of the motor driven spindle.

2. The hydrostatic tool system of claim 1 wherein the tool assembly further comprises:

a hydrostatic tool holder including;

an outer sleeve;

an inner sleeve nested within and engaging the outer sleeve;

a chamber formed between the inner sleeve and the outer sleeve for receiving a pressurized hydraulic fluid; and an hydraulic fitting hydraulically communicating with the chamber.

3. The hydrostatic tool system of claim 2 wherein the hydraulic fitting further comprises:

an hydraulic test point including an hydraulic test point housing including a poppet valve seat;

a poppet valve slideably disposed in the hydraulic test point housing; and a poppet valve spring biasing the poppet valve towards a closed position, wherein a tip of the poppet valve contacts the poppet valve seat restricting hydraulic flow through the hydraulic test point.

4. The hydrostatic tool system of claim 1 wherein the tool storage system further comprises:

a turret;

a turret shaft supporting the turret;

a plurality of tool assembly receivers attached to and extending from a periphery of the turret; and a turret drive connected to the turret shaft for advancing the turret to a selected orientation to present a selected tool assembly for pickup by the tool transport system.

5. The hydrostatic tool system of claim 4 wherein the plurality of tool assembly receivers further comprise a plurality of tool clamps attached to and extending from a periphery of the turret.

6. The hydrostatic tool system of claim 4 wherein the plurality of tool assembly receivers further comprise a plurality of dummy spindles attached to and extending in a substantially vertical orientation from the turret.

7. The hydrostatic tool system of claim 1 wherein the tool transport system further comprises:

a carriage;

a primary frame movable along the carriage in either a forward direction or a reverse direction along an X axis;

a horizontal travel actuator connected to the primary frame for motivating the primary frame along the carriage;

a lifting cylinder supported by the primary frame;

a head frame assembly attached to the lifting cylinder, the head assembly frame including a first head frame arm and a second head frame arm;

a clamping arm cylinder attached to the head frame assembly;

a clamping arm frame attached to the clamping arm cylinder, the head assembly frame assembly, the clamping arm cylinder and the clamping arm frame movable along a Y axis with a vertical movement of the lifting cylinder;

a first articulated arm including a first upper sub-arm pivotably connected to a first lower sub-arm, the first upper sub-arm pivotably connected to the clamping arm frame and the first lower sub-arm pivotably connected to the first head frame arm;

a second articulated arm including a second upper sub-arm pivotably connected to a second lower sub-arm, the second upper sub-arm pivotably connected to the clamping arm frame and the second lower sub-arm pivotably connected to the second head frame arm; and the first articulated clamping arm and the second articulated clamping arm configured for gripping articulation between the first lower sub-arm and the second lower sub-arm upon vertically downward travel of the clamping arm cylinder.

8. The hydrostatic tool system of claim 1 wherein the tool transport system further comprises:

a primary frame;

a primary frame rotational motion actuator connected to the primary frame for rotating the primary frame about a substantially vertical axis;

a lifting cylinder supported by the primary frame;

a head frame assembly attached to the lifting cylinder, the head frame assembly including a first head frame arm and a second head frame arm;

a clamping arm cylinder attached to the head frame assembly;

a clamping arm frame attached to the clamping arm cylinder, the head frame assembly, the clamping arm cylinder and the clamping arm frame movable along a Y axis with a vertical movement of the lifting cylinder;

a first articulated arm including a first upper sub-arm pivotably connected to a first lower sub-arm, the first upper sub-arm pivotably connected to the clamping arm frame and the first lower sub-arm pivotably connected to the first head frame arm;

a second articulated arm including a second upper sub-arm pivotably connected to a second lower sub-arm, the second upper sub-arm pivotably connected to the clamping arm frame and the second lower sub-arm pivotably connected to the second head frame arm; and the first articulated clamping arm and the second articulated clamping arm configured for gripping articulation between the first lower sub-arm and the second lower sub-arm upon vertically downward travel of the clamping arm cylinder.

9. The hydrostatic tool system of claim 1 wherein the hydraulic coupler further comprises:

a poppet actuator assembly including an actuator cap, the actuator cap including a center bore, the center bore including an actuator cap seat;

a stem slideably positioned in the actuator cap, the stem including a center bore projecting through a length of the stem, a first orifice extending through a side wall of the stem into the center bore near a first end of the stem and a second orifice extending through a side wall of the stem into the center bore near a second end of the stem;

a seal positioned about the stem, the stem extending longitudinally through the seal, the seal being seated in the actuator cap seat;

a test point housing connected to the actuator cap;

a poppet valve slideably disposed within the test point housing;

a poppet valve spring biasing the poppet valve towards a closed position, wherein a tip of the poppet valve contacts the first end of the stem and the stem seal is seated in the actuator cap seat restricting flow through the poppet valve; and a pressurized source for hydraulic fluid connected to the test point housing.

* * * * *